US006810211B1

(12) United States Patent
Castanon

(10) Patent No.: US 6,810,211 B1
(45) Date of Patent: Oct. 26, 2004

(54) PREFERRED WDM PACKET-SWITCHED ROUTER ARCHITECTURE AND METHOD FOR GENERATING SAME

(75) Inventor: Gerardo A. Castanon, Irving, TX (US)

(73) Assignee: Alcatel, Paris (FR)

(*) Notice: Subject to any disclaimer, the term of this patent is extended or adjusted under 35 U.S.C. 154(b) by 552 days.

(21) Appl. No.: 09/584,325

(22) Filed: May 30, 2000

Related U.S. Application Data

(60) Provisional application No. 60/152,918, filed on Sep. 8, 1999.

(51) Int. Cl.[7] .................................................. H04J 14/00
(52) U.S. Cl. .......................................... 398/47; 398/51
(58) Field of Search ............................ 398/45, 75, 53, 398/54, 51, 47

(56) References Cited

U.S. PATENT DOCUMENTS

| | | | | |
|---|---|---|---|---|
| 4,914,648 A | * | 4/1990 | Acampora et al. ............ 398/79 |
| 5,416,769 A | * | 5/1995 | Karol ......................... 370/414 |
| 5,469,284 A | | 11/1995 | Haas .......................... 359/139 |
| 5,486,943 A | | 1/1996 | Sasayama et al. .......... 359/123 |
| 5,734,486 A | | 3/1998 | Guillemot et al. .......... 359/139 |
| 5,737,106 A | | 4/1998 | Sansonetti et al. ......... 359/140 |
| 6,101,012 A | * | 8/2000 | Danagher et al. .......... 359/127 |
| 6,351,466 B1 | * | 2/2002 | Prabhakar et al. .......... 370/413 |
| 6,418,148 B1 | * | 7/2002 | Kumar et al. ............... 370/468 |
| 6,442,141 B1 | * | 8/2002 | Borella et al. .............. 370/248 |
| 6,466,898 B1 | * | 10/2002 | Chan .......................... 703/17 |
| 6,683,876 B1 | * | 1/2004 | Tornes et al. ............ 370/395.1 |

FOREIGN PATENT DOCUMENTS

WO     WO 98/47266     10/1998

OTHER PUBLICATIONS

G. Castanon et al., "Asymmetric WDM All–Optical Packet Switched Routers", Optical Fiber Communication Conference 2000, Mar. 7, 2000~Mar. 10, 2000, IEEE, 2000.*
J. Freebersyser et al., "Efficient Simulation of Cell Loss Probability in ATM Networks with Heterogeneous Connection Traffic Descriptors", IEEE 1996.*
G. Castanon et al., "Routing in All–Optical Packet Switched Irregular Mesh Networks", Globecom '99, IEEE, 1999.*
S. Danielsen et al., "Wavelength Conversion in Optical Packet Switching", Journal of Lightwave Technology, vol. 16, No. 12, Dec. 1998.*

(List continued on next page.)

*Primary Examiner*—Jason Chan
*Assistant Examiner*—Shi K. Li
(74) *Attorney, Agent, or Firm*—Gray Cary Ware & Freidenrich; Jessica W. Smith; V. Lawrence Sewell

(57) ABSTRACT

A preferred WDM all optical packet switched router architecture and an integrated analysis method for determining said architecture are disclosed. The method of the present invention includes the steps of simulating, with a network simulator, the operation of a desired network topology having at least one baseline router, establishing a steady state in the network simulation, applying a router and network dimensioning algorithm to the desired network topology for a predetermined number of clock cycles, and determining the preferred network router architecture based on the predetermined number of clock cycles. The baseline router used in the method of this invention can be a WDM all optical packet switched router, and the preferred network router architecture can be a WDM all-optical packet switched router architecture. One embodiment of the preferred WDM router architecture of this invention can be an asymmetric WDM router with a wavelength conversion module having a plurality of wavelength converters and shared output buffering

59 Claims, 23 Drawing Sheets

OTHER PUBLICATIONS

B. Li et al., "QoS–Enabled Voice Support in the Next–Generation Internet: Issues, Existing Approaches and Challenges", IEEE Communication Magazine, Apr. 2000.*

B. Zheng et al., "Multimedia over ATM: Progress, Status and Future", IEEE 1998.*

(Operations Research, 2nd Edition, by Hamdy A. Taha, Macmillan 1976, pp. 5–7,523–524.*

J. Duato et al., "A Comparison of Router Architectures for Virtual Cut–Through and Wormhole Switching in a NOW Environment", Parallel and Distributed Processing 1999, Apr. 12–16, 1999.*

M. Chbat et al., "Toward Wide–Scale All–Optical Transparent Network: The ACTS Optical Pan–European Network (OPEN) Project", IEEE Journal on Selected Areas in Communications, vol. 16, No. 7, Sep. 1998.*

O. Altintas et al., "A Packet Scheduling Discipline for Supporting Real–Time Applications", IEEE 1997.*

G. Depovere, et. al., Philips Research Laboratories, "*A Flexible Cross–Connect Network using Multiple Object Carriers,*" Date Unknown, All Pages.

Listanti et al., "Optical Path Strategies in WDM All–Optical Networks: Minimmization of Wavelength Converters in Optical Cross Connects" Phoenix, Arizona, Nov. 3–8, 1997, New York, IEEE, US, pp. 583–587.

Thylen et al., "Switching Technologies for Future Guided Wave Optical Networks: Potentials and Limitations of Photonics and Electronics" IEEE Communications Magazine, Feb. 1, 1996, vol. 34, No. 2, pp. 106–113.

Kiyoshi et al., "A Portable Communication Terminal for Novices and its User Interface Software" IEICE Transactions on Communications, Tokyo, Japan, Oct. 1, 1995, vol. E78–B, No. 10, pp. 1387–1394.

Dupraz et al., "The Future of Photonic Switching" 1225 Electrical Communication, Alcatel, Brussels, BE, 1992, pp. 72–77.

* cited by examiner

| NODE | UTILIZATION | INLETS/OUTLETS | WO ACTIVE | PERCENTAGE | NDL |
|---|---|---|---|---|---|
| 0 | 0.43043 | 4/4 | 16 | 12.50000 | 1 |
| 1 | 0.54315 | 4/4 | 28 | 21.87500 | 6 |
| 2 | 0.46931 | 6/6 | 47 | 24.47917 | 52 |
| 3 | 0.45831 | 3/3 | 0 | 0.00000 | 0 |
| 4 | 0.60015 | 9/9 | 75 | 26.04167 | 64 |
| 5 | 0.43032 | 7/7 | 37 | 16.51786 | 1 |
| 6 | 0.62380 | 4/4 | 27 | 21.09375 | 2 |
| 7 | 0.38926 | 4/4 | 6 | 4.68750 | 0 |
| 8 | 0.50437 | 3/3 | 0 | 0.00000 | 0 |
| 9 | 0.58784 | 8/8 | 68 | 26.56250 | 118 |
| 10 | 0.44645 | 6/6 | 24 | 12.50000 | 1 |
| 11 | 0.54573 | 9/9 | 65 | 22.56944 | 103 |
| 12 | 0.50062 | 4/4 | 21 | 16.40625 | 51 |
| 13 | 0.50738 | 3/3 | 0 | 0.00000 | 0 |
| 14 | 0.49188 | 3/3 | 0 | 0.00000 | 0 |
| 15 | 0.56172 | 8/8 | 50 | 19.53125 | 2 |
| 16 | 0.48748 | 7/7 | 44 | 19.64286 | 6 |
| 17 | 0.38060 | 6/6 | 21 | 10.93750 | 0 |
| 18 | 0.35241 | 5/5 | 13 | 8.12500 | 0 |

| NODE | UTILIZATION | INLETS/ OUTLETS | WO ACTIVE | PERCENTAGE | TOTAL NDL PER OUTPUT BUFFER SCHEME | NDL SHARED BUFFER |
|---|---|---|---|---|---|---|
| 0 | 0.43043 | 4/4 | 16 | 12.50000 | 1 | 1 |
| 1 | 0.54315 | 4/4 | 28 | 21.87500 | 6 | 5 |
| 2 | 0.46931 | 6/0 | 47 | 24.47917 | 52 | 50 |
| 3 | 0.45831 | 3/3 | 0 | 0.00000 | 0 | 0 |
| 4 | 0.60015 | 9/9 | 75 | 26.04167 | 64 | 51 |
| 5 | 0.43032 | 7/7 | 37 | 16.51786 | 1 | 1 |
| 6 | 0.62380 | 4/4 | 27 | 21.09375 | 2 | 1 |
| 7 | 0.38926 | 4/4 | 6 | 4.68750 | 0 | 0 |
| 8 | 0.50437 | 3/3 | 0 | 0.00000 | 0 | 0 |
| 9 | 0.58784 | 8/8 | 68 | 26.56250 | 118 | 59 |
| 10 | 0.44645 | 6/6 | 24 | 12.50000 | 1 | 1 |
| 11 | 0.54573 | 9/9 | 65 | 22.56944 | 103 | 100 |
| 12 | 0.50062 | 4/4 | 21 | 16.40625 | 51 | 49 |
| 13 | 0.50738 | 3/3 | 0 | 0.00000 | 0 | 0 |
| 14 | 0.49188 | 3/3 | 0 | 0.00000 | 0 | 0 |
| 15 | 0.56172 | 8/8 | 50 | 19.53125 | 2 | 1 |
| 16 | 0.48748 | 7/7 | 44 | 19.64286 | 6 | 5 |
| 17 | 0.38060 | 6/6 | 21 | 10.93750 | 0 | 0 |
| 18 | 0.35241 | 5/5 | 13 | 8.12500 | 0 | 0 |

| OUTLET NUMBER | CONNECTED TO | NUMBER OF FIBERS | $B_n$ |
|---|---|---|---|
| 1 | 4 | 0 | 0 |
| 2 | 2 | 2 | 50 |
| 3 | 3 | 1 | 5 |
| 4 | 5 | 1 | 0 |
| 5 | 6 | 1 | 6 |
| 6 | 9 | 1 | 3 |
| 7 | 15 | 1 | 0 |
| 8 | 16 | 1 | 0 |
| 9 | 2 | 2 | 0 |

| OUTLET NUMBER | CONNECTED TO | NUMBER OF FIBERS | $B_n$ |
|---|---|---|---|
| 1 | 9 | 0 | 0 |
| 2 | 4 | 1 | 43 |
| 3 | 5 | 1 | 0 |
| 4 | 7 | 1 | 1 |
| 5 | 8 | 1 | 23 |
| 6 | 10 | 1 | 0 |
| 7 | 11 | 2 | 50 |
| 8 | 11 | 2 | 1 |

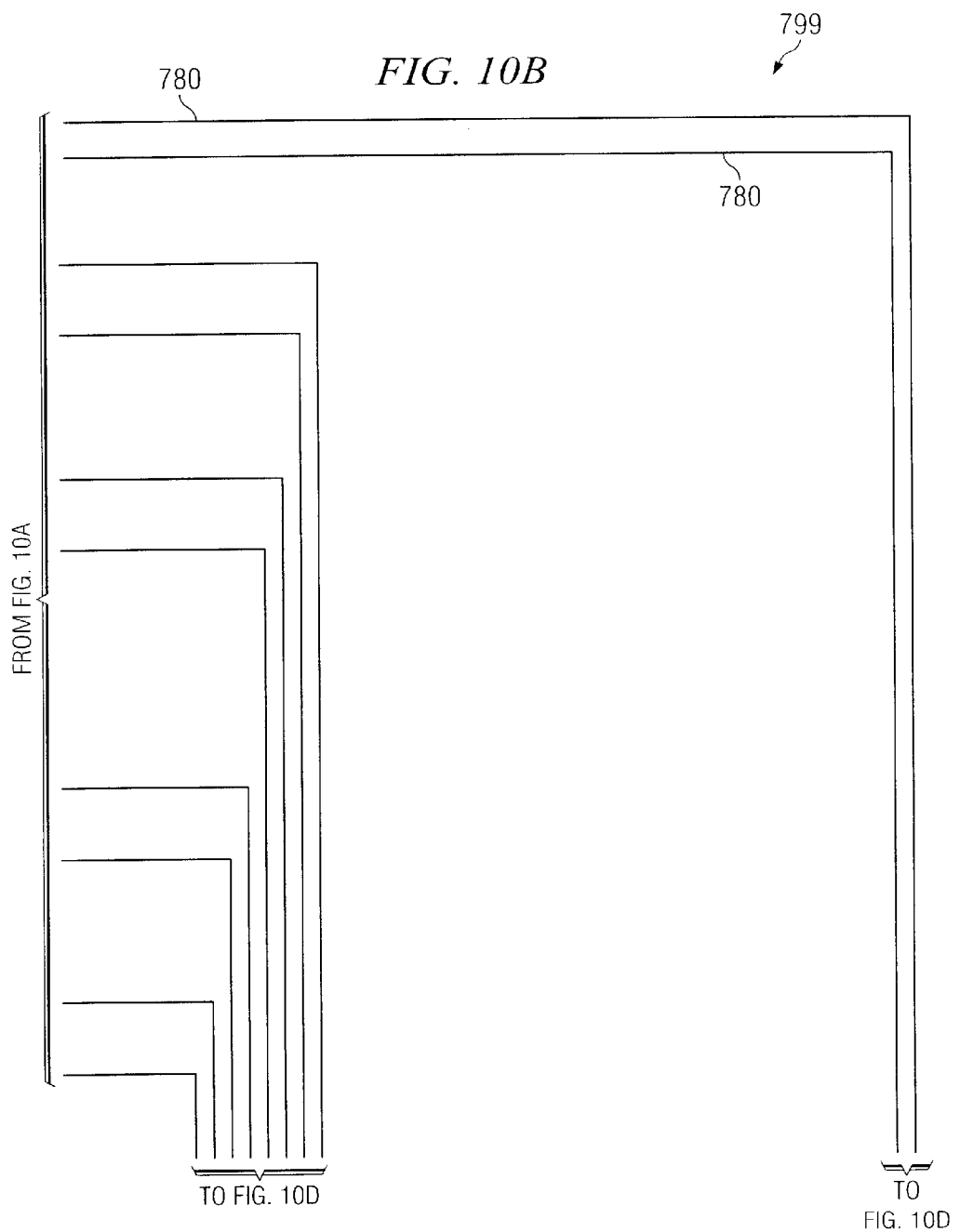

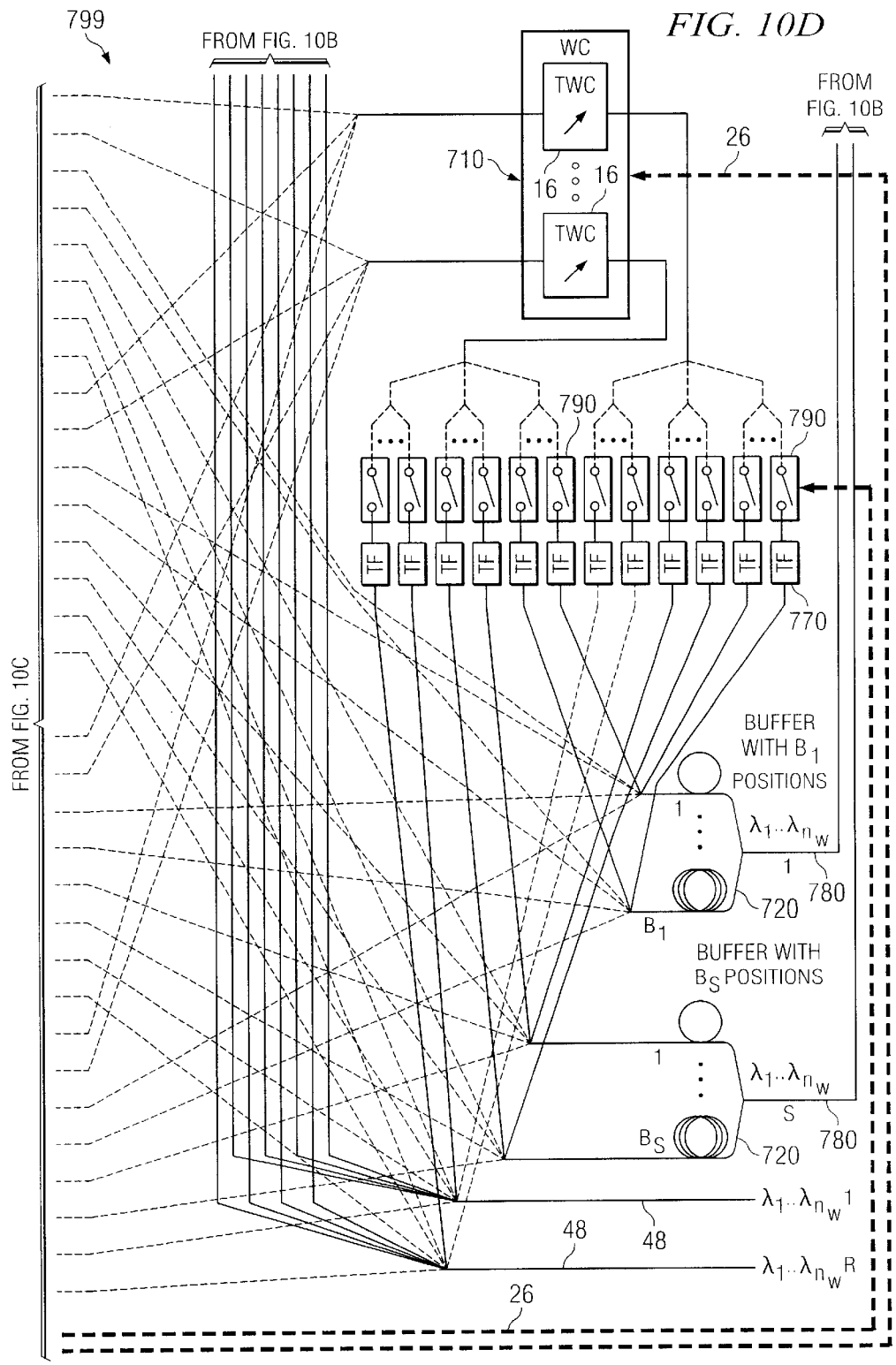

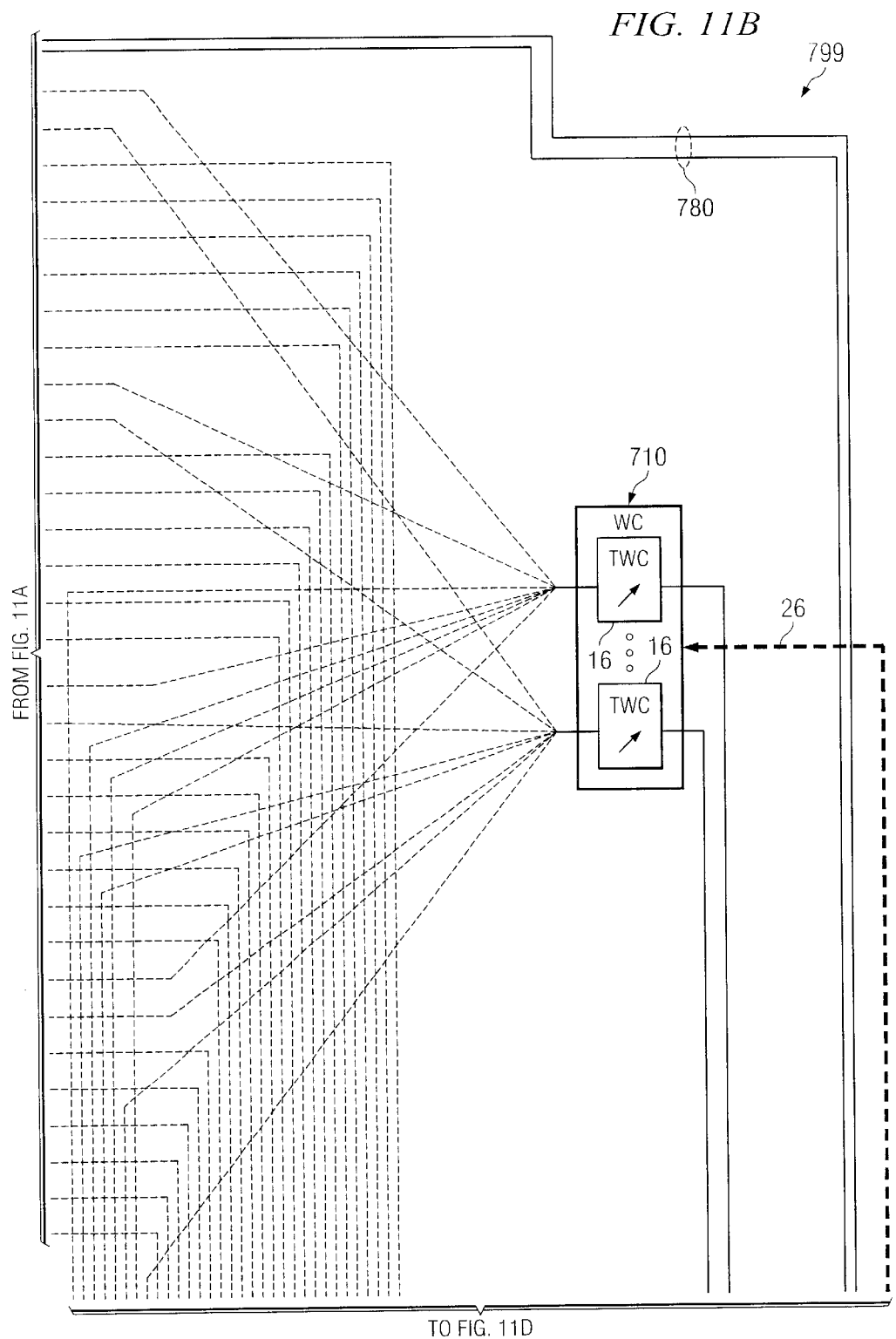

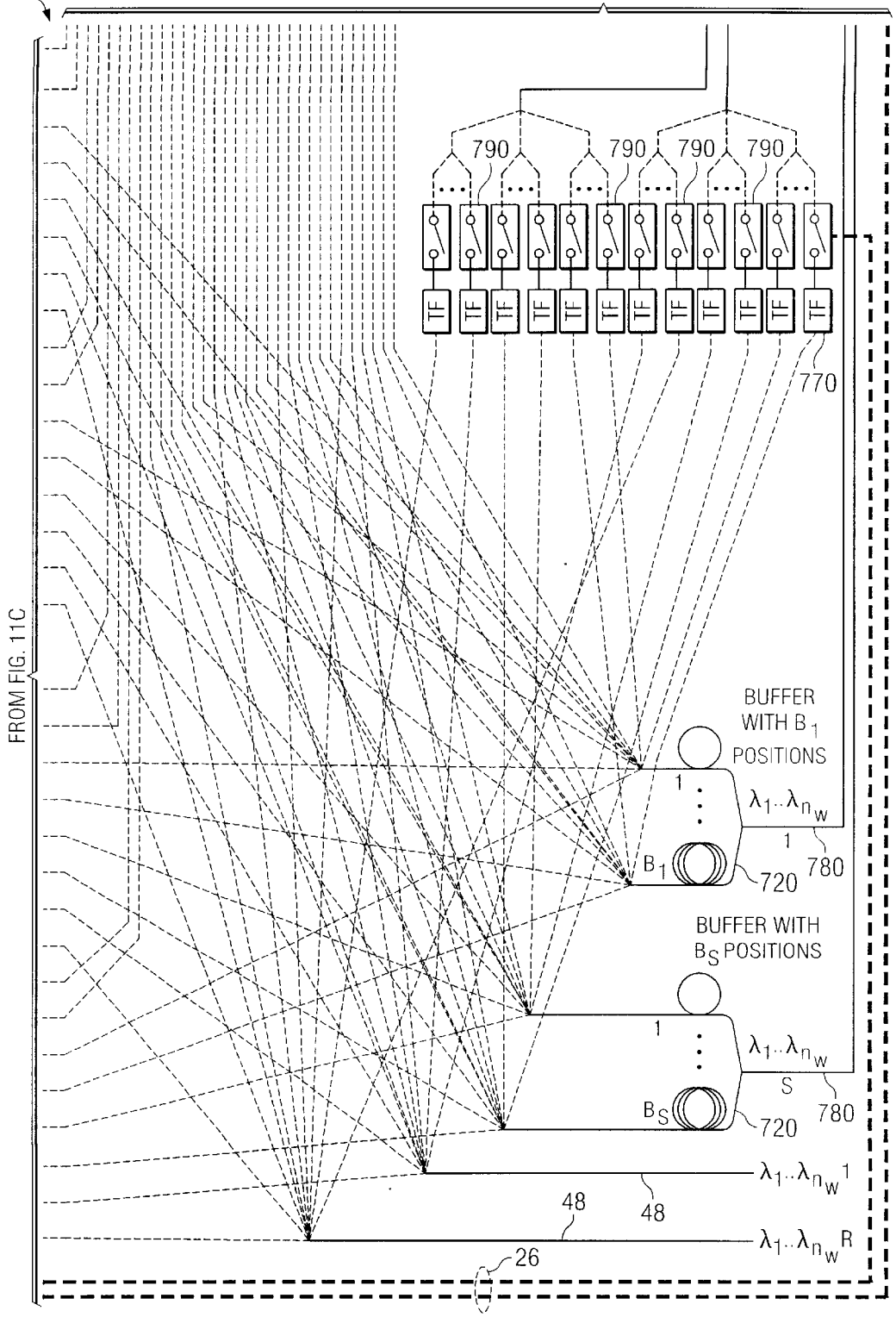

ial)# PREFERRED WDM PACKET-SWITCHED ROUTER ARCHITECTURE AND METHOD FOR GENERATING SAME This application claims priority under 35 U.S.C. § 119(e) to provisional application No. 60/152,918, filed Sep. 8, 1999, entitled "Asymmetric WDM All-Optical Packet Switched Routers With Or Without Shared Buffers," which is hereby fully incorporated by reference.

TECHNICAL FIELD OF THE INVENTION

The present invention relates generally to optical network systems and, more particularly, to all-optical packet-switched routers. Even more particularly, the present invention relates to an asymmetric WDM all-Optical packet-switched router architecture and method for generating the same.

BACKGROUND OF THE INVENTION

One of the major problems in the design of all-optical packet-switching routers is reducing the overall number of components in the router, and thus reducing the number of components a signal must pass through, without effecting the teletraffic performance of the network. The number of router components required is imposed in large part by the degree of blocking probability desired. Blocking occurs when two or more competing packets at the input of a router are destined for the same output. Buffering, deflection routing, wavelength translation and link dimensioning are some of the techniques that can be used to resolve data packet conflict.

Router teletraffic performance, and the optimization of the number of components needed in a router, are usually analyzed assuming an isolated node. Furthermore, a uniform distribution is typically assumed to assign the outlet destinations of incoming data packets. The consequences of these assumptions are that router architectures require balanced wavelength conversion capability and equal buffer depths for each outlet. These assumptions thus result in a greater than necessary number of components in current WDM routers.

An optical WDM router architecture designed using the assumptions discussed above typically employs tunable wavelength conversion and symmetric optical buffering. These symmetric WDM router architectures are not designed to optimize the number of components used to solve contentions between data packets. Due to a typical optical network's topology, packets in current WDM routers may generate traffic bottlenecks produced by a tendency of the routing scheme to send packets with different destinations along preferred paths. This effect increases the traffic load, and hence the probability of blocking at the output links of specific routers, in the network. A large buffer depth, or an increase in the number of fibers per link, is therefore needed to reduce the blocking probability.

However, typical network traffic behavior is not uniform (symmetric). Asymmetric wavelength conversion capabilities and asymmetric buffering capacity more closely follow network traffic patterns and can more efficiently solve contentions. Isolated analysis based on a single network node cannot yield an optimized router architecture. An integrated analysis that considers the network topology, routing scheme, dynamic traffic distribution and multiplexing gain of the routers in a network in a single optimization module is needed to obtain an optimum all-optical router architecture and network design. Sharing of components, such as output buffers, can also reduce the number of components in a router to a preferred level. The basic idea of integrated analysis is to simultaneously optimize decision variables of different functions that have traditionally been optimized in an isolated way.

SUMMARY OF THE INVENTION

Therefore, a need exists for an asymmetric WDM all-optical packet-switched router, with or without shared buffers, that can maintain performance comparable to that of current optical routers, with a reduced number of components as compared to current optical routers.

A further need exists for a method for determining a preferred all-optical packet-switched router architecture that can analyze the teletraffic performance and optimization of a network over multiple nodes.

A still further need exists for a method for generating a preferred all-optical packet-switched router architecture that does not assume a uniform distribution in assigning the outlet destinations of incoming data packets.

An even further need exists for a method for optimizing optical router architectures that can significantly reduce the number of components required to route data packets in a manner comparable to present all-optical packet-switched routers.

Still further, a need exists for a method for performing an integrated analysis that considers network topology, routing scheme, dynamic traffic distribution and router multiplexing gain within a single optimization model to determine an optimum all-optical router architecture for a given network design.

Even further, a need exists for a method for determining a preferred WDM all-optical packet-switched router architecture using an integrated analysis that simultaneously optimizes decision variables of different functions that have traditionally been optimized in an isolated way.

The present invention provides a preferred WDM all-optical packet-switched router architecture, with or without shared buffers, and a method for determining the same that substantially eliminate or reduce the disadvantages and problems associated with previously developed all-optical packet-switched routers and methods for optimizing router component count and router placement in a network.

More specifically, the present invention provides a preferred WDM all-optical packet-switched router architecture, with or without shared buffers, and an integrated analysis method for determining said architecture. The method of the present invention includes the steps of simulating, with a network simulator, the operation of a desired network topology having at least one baseline router, establishing a steady state in the network simulation, applying a router and network dimensioning algorithm to the desired network topology for a predetermined number of clock cycles, and determining the preferred network router architecture based on the predetermined number of clock cycles. The baseline router used in the method of this invention can be a WDM all-optical packet-switched router, and the preferred network router architecture can be a WDM all-optical packet-switched router architecture with or without shared buffers.

One embodiment of the preferred router architecture of this invention comprises: at least one input fiber for receiving one or more optical data packets; a plurality of input demultiplexers for demultiplexing the data packets based on wavelength; an optical-to-electric converter associated with the output of each input demultiplexer for converting header information from each of the data packets into electric form; a control unit for processing the header information and generating control signals to control data packet routing through the router architecture; a space switch block for routing each data packet based on a current output status; a wavelength conversion module for assigning a different internal wavelength to data packets selected for conversion based on their current output status; a secondary space switch block for routing the wavelength converted data packets based on their current output status; a buffer (which can be shared), for applying a preset level of delay to data packets selected for delay (by the space switch block and the secondary space switch block) based on their current output status; a secondary demultiplexer associated with the output of the buffer for demultiplexing data packets selected for delay; a delay space switch block for routing the delayed data packets based on their current output status; and at least one output fiber for outputting the data packets from the router architecture.

The embodiment discussed above can be a WDM switched router architecture, and the one or more input fibers and at least one output fiber can be WDM fibers.

A technical advantage of the asymmetric WDM all-optical packet-switched router of the present invention is the ability to maintain performance comparable to that of current optical routers using a reduced number of components.

Another technical advantage of the method for determining a preferred asymmetric WDM all-optical packet-switched router of this invention is the ability to analyze the teletraffic performance and optimization of a network over multiple nodes.

A further technical advantage of the method for generating a preferred all-optical packet-switched router of this invention is that it does not assume a uniform distribution in assigning the outlet destinations of incoming data packets.

An even further technical advantage of the method for optimizing optical packet-switched router architectures of this invention is that it can significantly reduce the number of router components required to route data packets in a manner comparable to present all-optical packet-switched routers.

A still further technical advantage of the integrated analysis method of this invention is the ability to consider network topology, routing scheme, dynamic traffic distribution and router multiplexing gain within a single optimization model to determine an optimum all-optical router architecture for a given network design.

An even further technical advantage of the method for determining a preferred WDM all-optical packet-switched router architecture of this invention is that it can perform an integrated analysis that simultaneously optimizes decision variables of different functions that have traditionally been optimized in an isolated way.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIGS. 4A and 4B are tables outlining the results of the integrated analysis method of this invention for the Pan European topology of FIG. 3;

FIGS. 5 and 6 show tables that summarize the results of the number of delay lines per outlet for nodes 4 and 9 of FIG. 3;

DETAILED DESCRIPTION OF THE INVENTION

Preferred embodiments of the present invention are illustrated in the FIGUREs, like numerals being used to refer to like and corresponding parts of the various drawings.

The router architecture and method of integrated analysis of the present invention reduce and attempt to optimize the number of wavelength converters, optical buffers (delay lines) and other components used to solve the contention of data packets within a router in an optical network. The method of integrated analysis of this invention can be used to determine the number of wavelength converters that are simultaneously active and solving contentions of packets in a router and can determine how many delay lines (buffers) are required per outlet in the router to avoid those contentions. A router architecture can thus be determined that more efficiently uses a reduced number of components to solve contentions in a given network. As a particular example, a preferred router architecture employing shared output buffers can be determined.

Figure 1A:
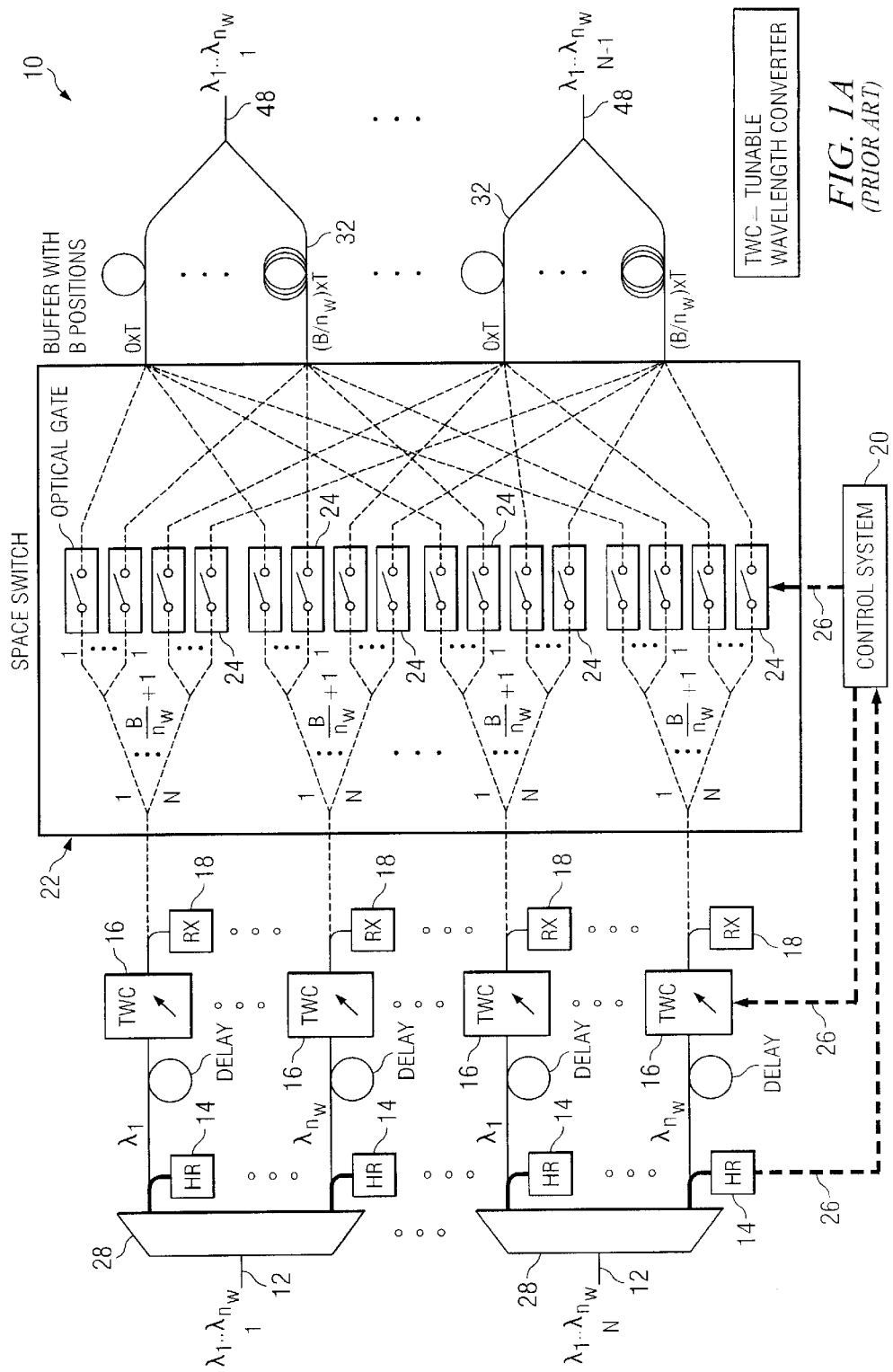
FIG. 1A shows a prior art symmetric WDM router architecture with tunable wavelength conversion and optical buffering.
Figure 1B:
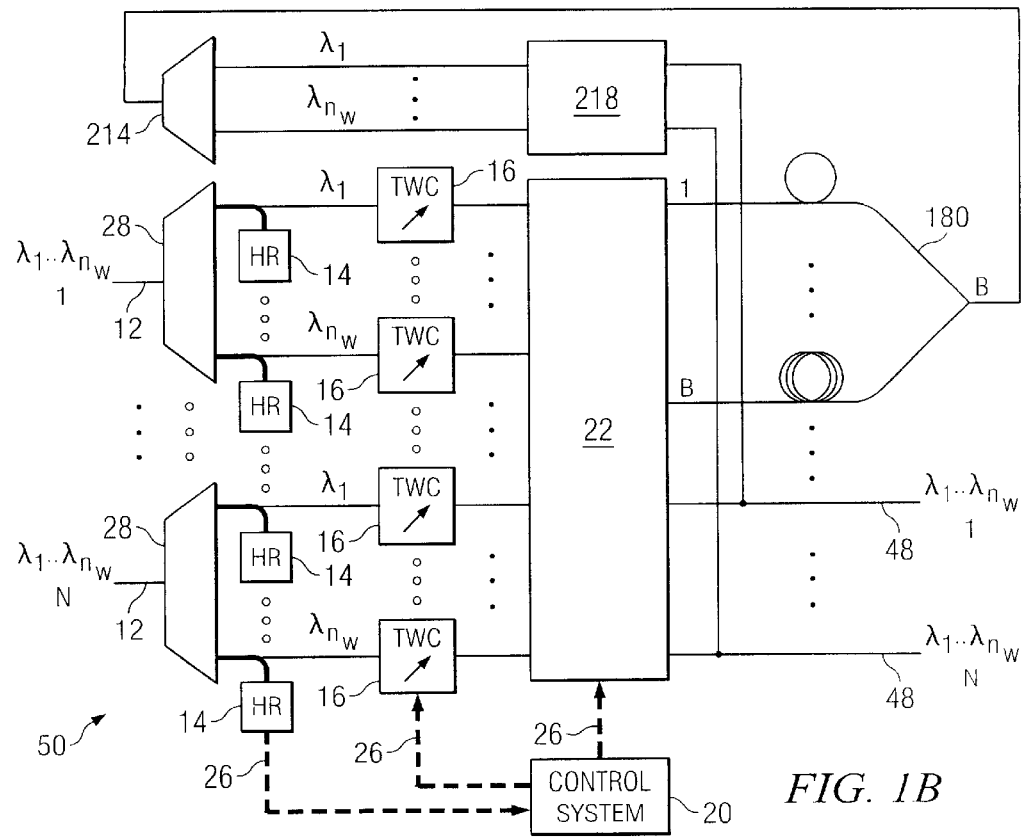
FIG. 1B shows an asymmetric WDM router with one shared output buffer.

The method of integrated analysis of the present invention can use as a baseline various router architectures, such as those shown in FIGS. 1A and 1B. FIG. 1A shows a prior art symmetric WDM router architecture with tunable wavelength conversion and optical buffering. FIG. 1B shows an asymmetric WDM router with one shared output buffer.

Figure 1D:
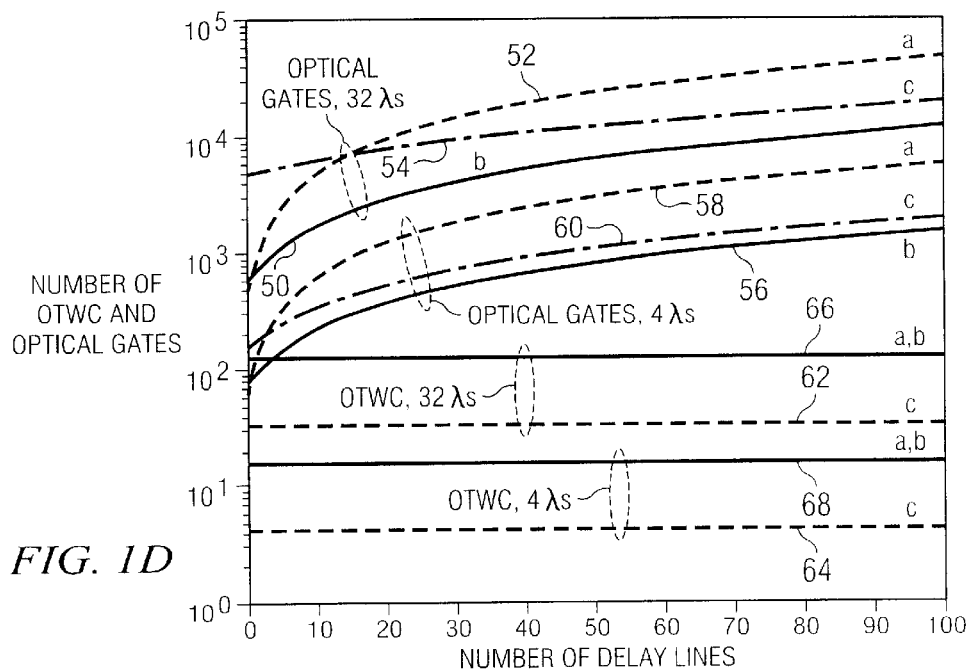
FIG. 1D shows comparison results of the number of optical tunable wavelength converters (OTWC) and the number of optical gates against the number of delay lines (NDL) of the three router architectures shown in FIGS. 1A, 1B and 1C.
Figure 1C:
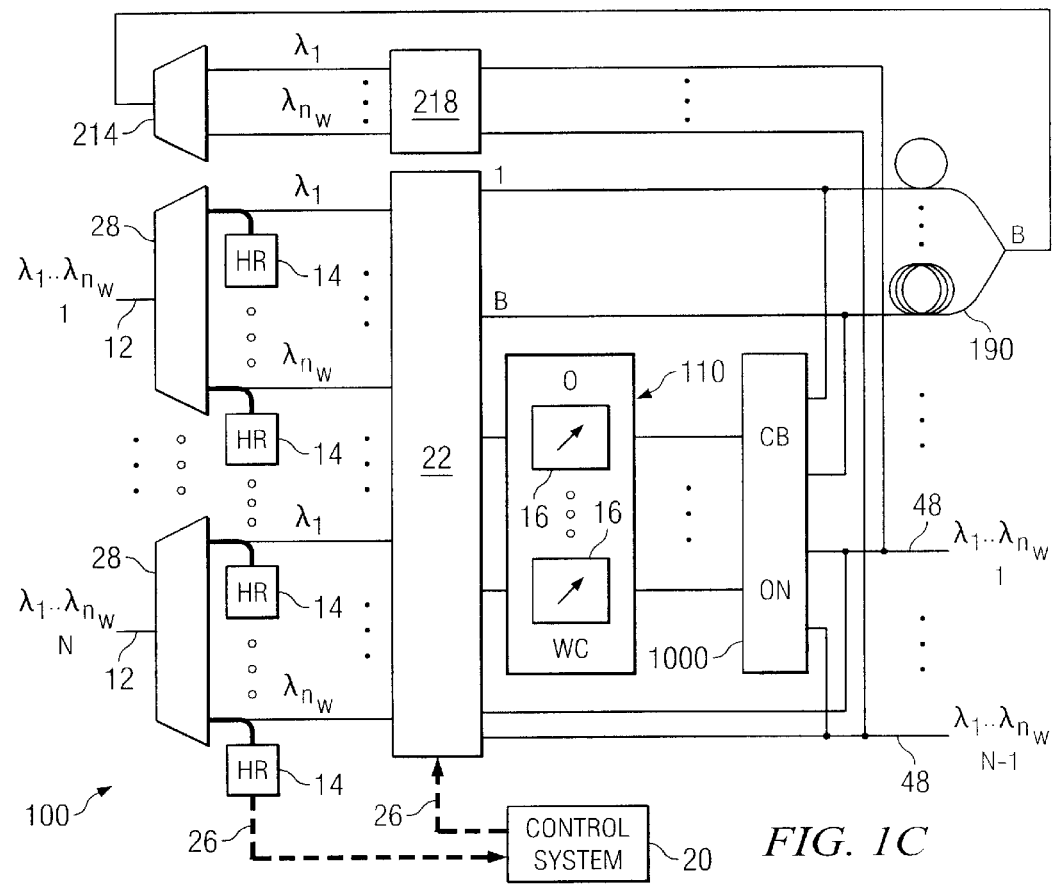
FIG. 1C shows an embodiment of this invention comprising an asymmetric WDM router with a wavelength conversion module having C wavelength converters ("WC"'s) and shared output buffering.

FIG. 1C shows an asymmetric WDM router with a wavelength conversion module having C wavelength converters (WC) and shared output buffering. FIG. 1D shows comparison results of the number of optical tunable wavelength converters (OTWC) and the number of optical gates needed against the number of (buffers) delay lines (NDL) of the three router architectures shows in FIGS. 1A, 1B and 1C.

As can be seen from FIG. 1D, the number of optical gates required for the architecture shown in FIG. 1B (curves 52 and 56) is lower than that required for the architectures shown in FIGS. 1A and 1C (curves 52/58 and 54/60, respectively). However, the architecture of FIG. 1C requires a lesser number of wavelength converters (curves 62 and 64) than the architectures shown in FIGS. 1A and 1B (curves 64 and 66). As will be discussed more fully below, the router architecture of FIG. 1C is one example of the results of using the integrated analysis method of this invention for optimizing the number of router components (such as wavelength converters). For example, the method of this invention was used to determine that only about 30% of the wavelength converters in the architectures shown in FIGS. 1A and 1B are active (solving contention of packets) per time slot. The preferred architecture of FIG. 1C takes advantage of this fact to reduce the number of wavelength converters by eliminating the inactive wavelength converters while maintaining the router's level of performance The router architecture shown in FIG. 1A is a prior art architecture having tunable wavelength conversion and optical buffering. Router 10 can have 1 to N input WDM fibers 12, where N is an arbitrary number whose value is limited by size and technology constraints, as discussed more fully below. Input WDM fibers 12 can carry optical data packets consisting of payload data bits and data packet header information. Header information can be extracted from a data packet and processed electronically via control unit 20. The data packet can then pass through router 10 in an entirely optical format and output from router 10 on one of N−1 output WDM fibers 48.

Control unit 20 can direct the operation of the various components of router 10 to ensure the data packets are routed to the correct output WDM fiber 48. Control unit 20 can perform this function by updating the control information for input wavelength converters 16, header readers 14, and semiconductor optical amplifiers (SOAs) 24 within space switch 22. Header readers 14 can be optical to electronic converters that convert the optical header information to an electronic format for processing by control system 20. Control system 20 can then provide a control signal 26 to control the operation of the routing mechanisms discussed above.

Input WDM fibers 12 can carry multiple data packets, each having different wavelengths as they arrive at input demultiplexers 28. Router 10 can have from 1 to N input demultiplexers 28, one each corresponding to each of the N input WDM fibers 12. Input demultiplexers 28 can separate out the multiple wavelength data packets arriving on WDM fibers 12 and can forward each individual wavelength signal (data packet) to an input wavelength converter 16. Router 10 can have from 1 to N input wavelength converters 16, one each for each input WDM Fiber 12. Incoming data packets can thus be demultiplexed at the input to router 10 and have a possibly different internal wavelength assigned by input wavelength converters 16.

Each incoming data packet along an input WDM fiber 12 can be assigned to a different wavelength by an input wavelength converter 16. As discussed above, each input WDM fiber 12 can carry up to n wavelengths that can be assigned to incoming data packets, where n is an arbitrary number determined by the capacity of available switching technology. A typical number for n in current optical routers is 32. Because there are up to N WDM fibers 12 and each of the WDM fibers 12 can have up to n wavelengths assigned to it, the total number of possible wavelengths is N×n. The all-optical IP switching router architecture of the present invention, however, is scalable to a greater number of wavelengths.

In the router architectures of FIGS. 1A, 1B and 1C, input wavelength converters 16 are tunable wavelength converters. Tunable wavelength converters 16 receive control signal 26 from control unit 20 to control their operation. Despite the need for a control signal from control unit 20, tunable wavelength converters 16 can provide more expansion capabilities and greater flexibility than fixed wavelength converters. Tunable input wavelength converters 16 of FIGS. 1A, 1B and 1C can convert the wavelength from an incoming data packet to any internal wavelength (including the same wavelength as the data packet had when arriving at tunable wavelength converters 16). Wavelength conversion can be performed to avoid conflicts that may exist when two or more data packets are destined for the same output.

A potential for a conflict exists if two or more data packets have the same wavelength and have the same output destination (i.e., each data packet has the same initial wavelength) as the data packets are routed to their intended output WDM fiber 48. A conflict can result in a loss and/or corruption of data. To avoid this conflict, one or more tunable wavelength converters 16 can, upon direction from control unit 20, convert the wavelengths of one or more of the same wavelength data packets to different unused wavelengths.

Control unit 20 can provide a control signal to input wavelength converters 16 to control the conversion of data packet wavelengths. Although router 10 is an optical switch architecture, a control unit 20 can provide a separate layer of electronics to control router 10. Control unit 20 can provide control information based on extracted header information from each data packet carried on the N input WDM fibers 12.

Header information can be extracted from each data packet downstream of input demultiplexers 14. The header information is forwarded to control unit 20 through header readers 14 that act as optical-to-electronic converters. Control unit 20 can determine from the extracted header information what wavelengths are being used within each input WDM fiber 12. Control unit 20 can then provide a control signal to the components of router 10 discussed above to route and/or convert the wavelengths of the data packet payloads based on their header information. Each of the data packet payloads can thus be routed to reach its intended switch output without conflict and the resulting possible loss/corruption of data. Control unit 20 can comprise software instructions to provide its functionality.

Control unit 20 can track every data packet wavelength so that it does not direct a wavelength conversion to occur that avoids one conflict only to cause another. Data packet wavelengths are converted to currently free wavelengths. At the output of each input wavelength converter 16, each data packet payload can have a different wavelength, even if one or more data packet payloads are going to the same router 10 output.

In the event that a large number of incoming data packets have the same wavelength and are going to the same switch output, a simple wavelength conversion may not be enough to avoid conflict. To avoid a conflict in this situation, router 10 can also include delay buffers 32. Delay buffers 32 can insert an appropriate delay between one or more of the data packets intended for the same switch output. Delay buffers 32 can be optical fiber delay line (FDL) buffers. Further, each delay buffer 32 (whether shared or not) can comprise one or more fiber delay lines (buffers), each capable of inserting either a zero delay, or a delay of one or more unit increments. The unit increments can be equal to the average size of said data packets, or can be some other arbitrary unit of delay.

From input wavelength converter 16, data packet payloads (each possibly having a different wavelength) can be forwarded to SOAs 24 within optical space switch 22. Optical space switch 22 is similar to an electronic space switch but operates entirely in the optical domain. SOAs 24 within optical space switch 22 are like an on/off switch that can either pass a signal when "on," or can block a signal from passing when "off."

SOAs 24 can be controlled by an input signal from control unit 20. Each SOA 24 can have a driver to control its operation. For example, if the current through an SOA 24 is one value (e.g., 200 milliamps), then input SOA 24 can become transparent and pass an incoming signal through it. Alternatively, if the current through an SOA 24 is a lesser value (e.g., 50 milliamps), SOA 24 can become obscure and absorb the optical signal, preventing transmission. SOAs 24 can provide the capability for fast data packet switching.

Buffers 32 can also be used in combination with SOAs 24 to avoid data packet conflicts. Router 10 can direct one or more data packets to different levels of delay in one or more delay buffers 32. SOAs 24, with their capability for fast data packet switching, can be used to direct incoming data packets to different delay buffers 32.

The delay buffer 32 to which a data packet payload is directed determines the amount of delay inserted into that data packet. As shown in FIG. 1A, the output from SOAs 24 can be forwarded to any one of the differing levels of delay within delay buffer 32. The number of delay buffers 32 within the router architectures of FIGS. 1A, 1B and 1C can be determined by the performance desired from router 10. For example, if the data through-put is 10,000 data packets per second and the maximum acceptable loss desired is one data packet per second, then the number of delay buffers 32, B, can be made equal to, e.g. 10, corresponding to ten possible levels of delay. If, on the other hand, out of the 10,000 data packets per second, it is acceptable to lose ten data packets per second, then B might be made equal to a single delay buffer (i.e., B=1).

Once delay buffers 32 have inserted the appropriate level of delay into each of the data packets from input WDM fibers 12, all of the data packets delayed by a given delay buffer can be coupled together and forwarded along an output WDM fiber 48, in a manner well known in the art. Each of the architectures shown in FIGS. 1A, 1B and 1C can thus provide a multicast capability at the switch level, since any incoming data packet along an input WDM fiber 12 can be routed through space switch 22 so as to output from router 10 along any one, or any combination of, output WDM fibers 48.

Router 10 can thus provide for multicast/broadcast capability, voice-over-IP, and video on demand. Router 10 can provide these functions because wavelength converter 16, space switch 22, SOAs 24, and buffers 32 together can provide the ability to allow every output WDM fiber 48 from router 10 to selectively receive all or part of the information carried along any combination of input WDM fibers 12. Any incoming data packet can thus be routed to any one, to all, or to any combination of output WDM fibers 48. These capabilities are an advantage that can be incorporated into any embodiment of the router architecture of this invention.

The router architecture shown in FIG. 1B has components with similar functionality to those of the architecture in FIG. 1A. The operation of these components is functionally the same as discussed above for FIG. 1A. The architecture of router 50 of FIG. 1B, however, is an asymmetric WDM router architecture with shared optical buffering. As opposed to the architecture of FIG. 1A, not every data packet is routed through an FDL buffer 32. In the architecture of FIG. 1A, each data packet was routed through a buffer 32, which could provide varying levels of delay, from zero delay up to a maximum level of delay for that buffer, as determined by the performance desired from router 10. In contrast, the architecture of router 50 of FIG. 1B provides for routing through a shared buffer 180 for only those wavelength data packets that are selected for buffering so as to avoid conflicts.

As is shown in the architecture of FIG. 1B, all incoming data packets undergo wavelength conversion through tunable wavelength converters 16, (even if to the same wavelength), as is the case in the architecture of FIG. 1A. However, upon having their wavelengths converted, some data packets can be routed straight through to an output along WDM fibers 48, while others are instead forwarded to buffers 32 to have a conflict avoiding delay inserted. These data packets are then recirculated through a secondary demultiplexer 214 and routed through a delay space switch 218, which can then forward them to an output WDM fiber 48. The architecture of FIG. 1B thus provides for wavelength conversion of all incoming data packets followed by buffering of only those selected data packets that require delay to avoid conflicts.

The architecture of FIG. 1C is a WDM router with asymmetric wavelength conversion and shared output optical buffering (as in FIG. 1B). The description of the components of FIG. 1C is functionally the same as that of FIGS. 1A and 1B. The architecture of FIG. 1C does not provide for wavelength conversion of all incoming data packets as in FIGS. 1A and 1B, but instead selects within space switch 22, using SOA's 24, only those data packets that require wavelength conversion to avoid conflicts.

The architecture of FIG. 1C can thus provide for data packets to be routed through router 100 without wavelength conversion and without buffering, going straight through space switch 22 to an output WDM fiber 48; or, data packets can be routed through space switch 22, get wavelength converted within wavelength conversion module 110 to avoid a conflict, and then go through secondary space switch block 1000 to be directed to an output WDM fiber 48; or, data packets can enter router 100, get routed through space switch block 22, get wavelength converted within wavelength conversion module 110, go through secondary space switch block 1000 to get directed to buffer 190 (which can be a shared buffer)to avoid conflict, then get recirculated through secondary demultiplexer 214 and delay space switch 218, and then exit along a WDM output fiber 48; or, lastly, data packets can get routed through router 100 without wavelength conversion, with buffering and recirculation, and then exit along a WDM fiber 48.

The route taken by each data packet can be determined based on a current output status, e.g., the data packet's intended output fiber 48. Wavelength conversion module 110 can have any number of wavelength converters 16, as determined by the performance requirements of router 100. The method of the present invention reduces and attempts to optimize the number of delay lines, the number of fibers per link, and the number of wavelength converters required in a router within an optical network. Router 100 of FIG. 1C is one embodiment of the asymmetric all-optical packet-switched router architecture of this invention.

The integrated analysis method of this invention can determine a preferred router architecture, such as that of FIG. 1C, by applying a router and network dimensioning algorithm to a baseline router architecture, such as that in FIGS. 1A and 1B, within a simulated network topology. The dimensioning algorithm can increase the buffer depth by one unit every time a packet is lost in a specific outlet. Also, in the event the number of delay lines reaches a preset arbitrary limit, the method of this invention can increase the number of fibers for that specific link. At the beginning of each simulation, the buffer depth is set to zero and the maximum buffer depth allowed during the network dimensioning period is set to an arbitrary number, such as 50. This number is constrained by cost and router performance desired.

The network topology simulation used to compute the results of the integrated analysis method of this invention can be a Monte Carlo simulation, as known to those in the art. This model simulates the functions/operation of an entire network using a C language program. The model simulates the propagation of packets in the fiber links using vectors of length:

$$W=[l_{ij}/(c/n)] \cdot R/M \ 11.75R[Gb/a] \cdot l_{ij}[km]$$

where W is the ratio of link length to the spatial length of one slot, $L_{IJ}$ is the spatial link length between routers i and j, C/N is the light speed in optical fibers of refraction index n=1.5, R is the hit rate, and M is the packet size (in number of bits). Every data packet is provided information about its respective destination router, and the destination router is used to compute the preferred output for every arriving packet to a router. To decide the router output for every arriving packet, single path routing with least number of hops is used. This routing decision is based on the network topology information. In every time slot, the content of every vector used to emulate the links between routers in the whole network is updated, and every vector used to emulate the optical buffers is updated as well.

As stated above, FIG. 1C is one embodiment of a router architecture obtained using the integrated analysis method of this invention. To obtain the number of wavelength converters required for the router 100 architecture of FIG. 1C, the method of this invention was used to compute the maximum number of wavelength converters active during the steady state period of the simulation and the number of delay lines needed per output buffer scheme. The simulation cycle (number of clock cycles (or time slots)) used for the optical buffer and fiber link dimensioning, and for the transient period of this sample simulation, was 200,000 clock cycles.

However, the simulation cycle can be an arbitrary (preset) number of clock cycles. The simulation cycle should be chosen such that it is sufficient for the transient period to die out, and to perform the network dimensioning analysis to determine a preferred network router architecture. One way of determining the sufficiency of the simulation cycle is the establishment of the condition where injection throughput equals absorption throughput plus loss throughput. Injection throughput is the total number of data packets injected into the network in a clock cycle, loss throughput is the total number of data packet losses, and absorption throughput is the total number of data packets correctly received at a destination router. The number of clock cycles used can differ depending on the network topology.

Figure 2A:
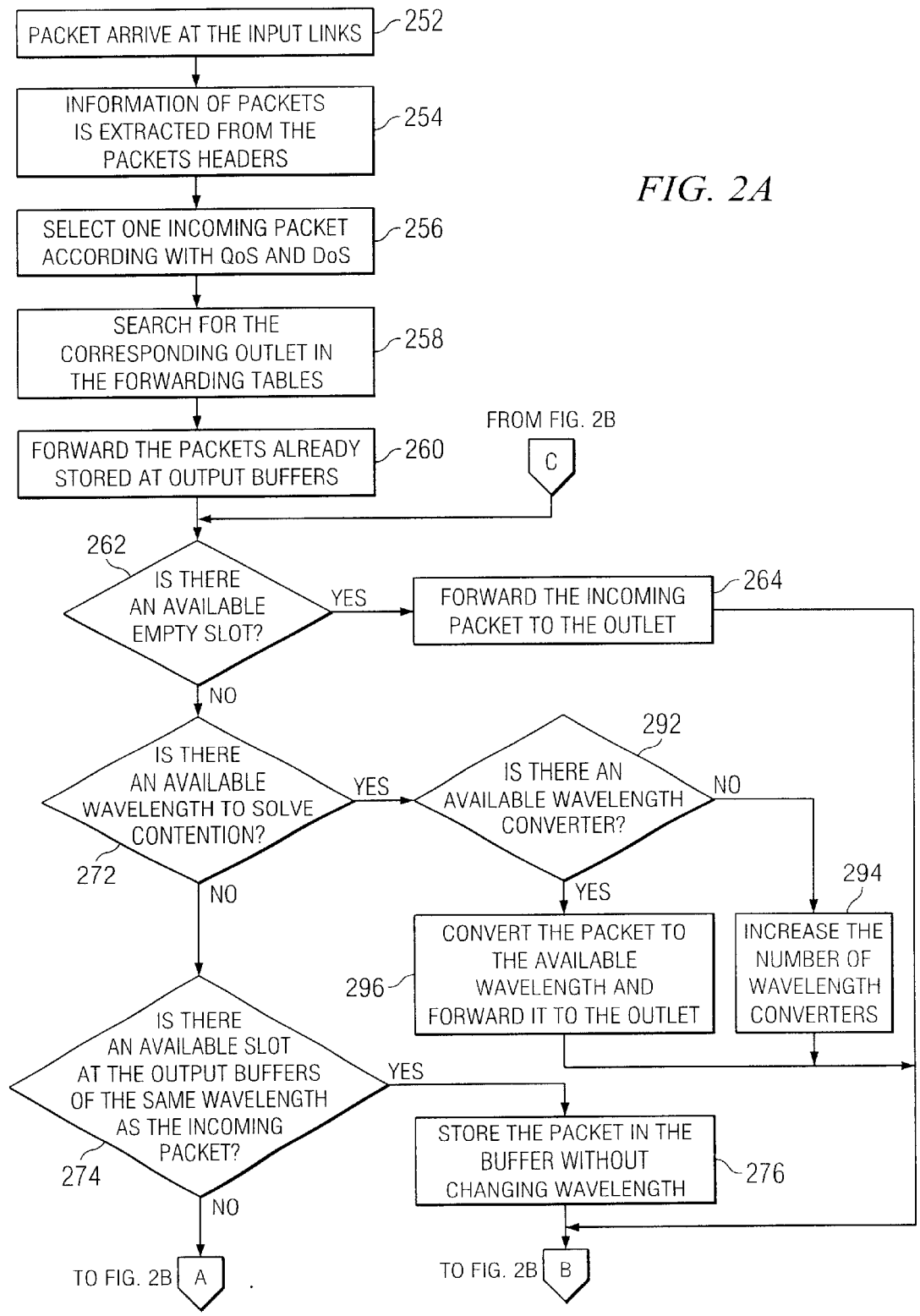
FIG. 2 is a flow diagram of the buffer and fiber link dimensioning algorithm of the method for integrated analysis of the present invention.
Figure 2B:
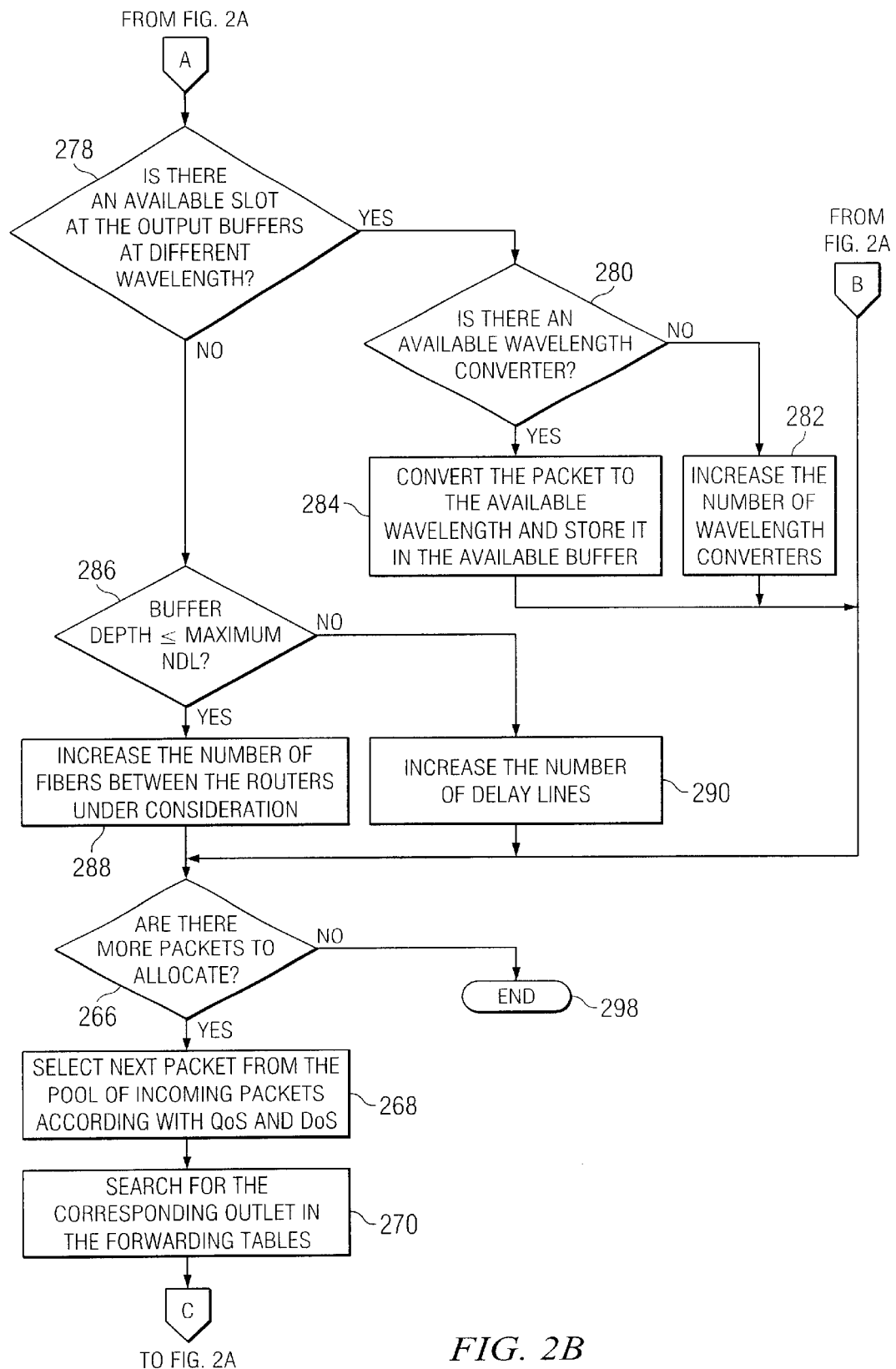

The buffer dimensioning consists of increasing the buffer depth by one unit every time a packet is lost. At the beginning of the simulation, the buffer depth is zero and the maximum buffer depth all-owed during the buffer dimensioning period was set to 50, as discussed above. The fibers per link dimensioning consists of increasing the number of fibers between two routers by one unit when the outlet under consideration reaches the maximum number of delay lines (50, in this case) and a packet is lost. Flow diagrams of the buffer dimensioning and fiber/link dimensioning algorithm of the present invention are shown in FIG. 2 and are discussed more fully below.

The traffic model for the injected self-similar traffic follows a conventional On/Off sources model, where the traffic is represented by alternating On (packet presence) and Off (inter arrival time) periods. The length T of each period is modeled according the Pareto heavy tail distribution $$T=[1/(U)^{1/\alpha}]$$

where U is a random variable uniform on [0,1] and [α] indicates the ceiling function. This implements a (rounded) Pareto distribution, which has infinite variance when 1α2, and hence it results in an aggregate traffic exhibiting self-similarity with Hurst parameter H=(3−α/2). To assign an output destination to packets, a uniform distribution can be used. Also, one input link is used for packet injection in all the routers of the network.

To compute the statistics generated by the integrated analysis method of this invention for the router architecture of FIG. 1C, data for 100,000 clock cycles was collected during a steady state period. The number of clock cycles in steady state can be varied based on the network topology. To assure that the simulation was in steady state at the time the computation started, the simulator compared the mean number of packets injected into the network per time slot (injection through-put) and the mean number of packets going out of the network per time slot (absorption through-put) plus the mean number of packets lost in the network per time slot (lost through-put) after the transient period. For every probability of packet injection g, a small difference on the order of $10^{-2}$ was obtained between the injection through-put and the sum of absorption through-put and lost through-put.

It is assumed for this simulation that there is one receiver per wavelength, as shown in FIG. 1A (at the input links), except for at an injection link, so that all packets destined to the router can be detected and removed. The simulation tracks the path and location of every packet ingested into the network from source to destination. Therefore, effects like asymmetry of the traffic produced by irregular topologies and source destination asymmetric traffic behavior can be observed.

FIG. 2 is a flow diagram of the buffer and fiber link dimensioning algorithm of the method for integrated analysis of the present invention. At block 250, the algorithm of the method of this invention starts. At step 252, data packets arrive at, for example, the input links of router 10 of FIG. 1A. At step 254, data packet information is extracted from the data packets' headers. At step 256, an incoming data packet is selected. At step 258, the method of this invention searches for the corresponding outlet in the forwarding tables for router 10. At step 260, the data packets already stored in output buffers 32 (which can be shared buffers), if any, are forwarded through router 10.

At step 262, the method of this invention determines if there is an available empty slot at the output of router 10. At step 264, if there is an available empty slot, the selected incoming data packet is forwarded to that outlet. At step 266, the method of this invention determines if there are more packets to allocate. If there are not, then the simulation ends, at step 298. If there are more packets to allocate, then at step 268 the next packet is selected from the pool of incoming data packets. At step 270, the corresponding outlet is searched for in the forwarding tables of router 10 and the method returns to step 262, where the above process is repeated.

If at step 262 there are instead no available empty slots, then at step 272 the method of this invention determines if there is an available wavelength to solve the contention. If there is, then the method of this invention searches for an available wavelength converter at step 292. If a wavelength converter is available, then at step 296 the data packet's wavelength is converted to the available wavelength and the packet is forwarded to the outlet. From there, the data packet goes through step 266, as described above. If there is no available wavelength converter, then the method for integrated analysis of the present invention increases the number of wavelength converters required at step 294. The method then proceeds to step 266, as discussed above.

If at step 272 there is no available wavelength to solve contention, then at step 274 the method of this invention determines if there is an available slot at the output buffers (which can be shared or unshared buffers) of the same wavelength as the incoming data packet. If there is, then at step 276 the data packet is stored in a buffer 32 without changing wavelengths. The method then progresses (as discussed above) to step 266 and continues as discussed above.

If at step 274 there is no available slot in the output buffer having the same wavelength as the incoming data packet, then at step 278 the method determines if there is an available slot at the output buffer at a different wavelength. If there is an available wavelength, then the method determines if there is an available wavelength converter at step 280. If there is an available wavelength converter, then at step 284 the data packet's wavelength is converted to the available wavelength and the data packet is stored in the available buffer. The method then progresses to step 266, as discussed above.

If at step 280 there is no available wavelength converter, then at step 282 the method of this invention increases the number of wavelength converters and goes to step 266, where the method progresses as discussed above.

If at step 278 there is no available slot at the output buffer at a different wavelength than the data packet, then at step 286 the method of this invention determines if the buffer depth is less than or equal to the maximum number of delay lines allowed. If it is not, then at step 290 the method of this invention increases the number of delay lines available, and then moves to step 266 to progress as discussed above. If at step 286 the buffer depth is at a maximum, then at step 288 the method of this invention increases the number of fibers between the routers under consideration. The method then progresses to step 266 and continues in the manner described above until there are no more packets to allocate.

Figure 3:
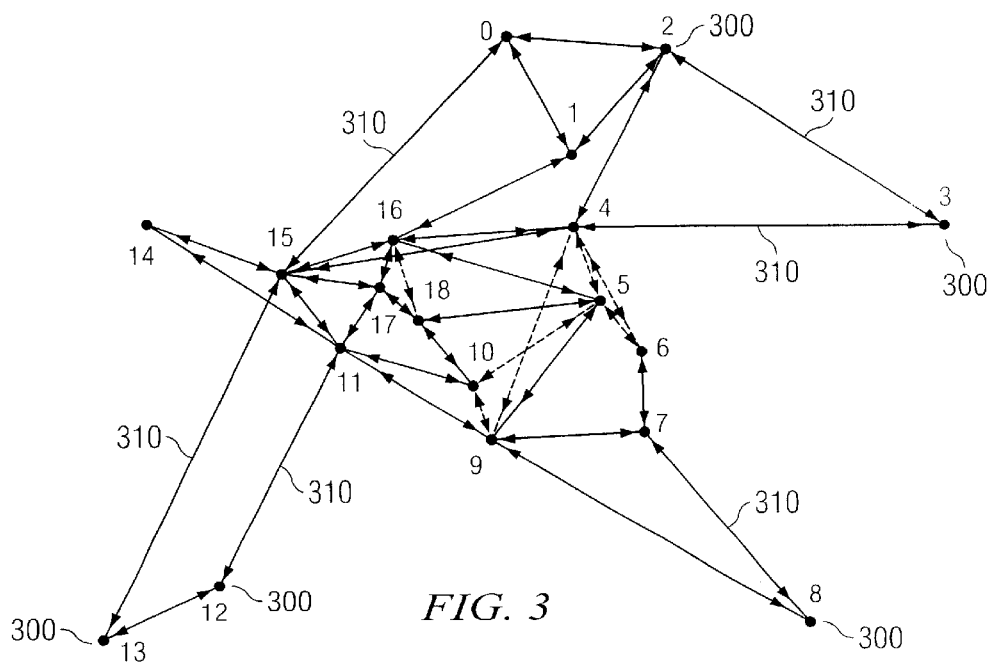
FIG. 3 shows the Pan European network topology that can be used by the method for integrated analysis of this invention.

FIG. 3 shows the Pan European network topology that can be used by the method for integrated analysis of the present invention to perform the dimensioning process. FIG. 3 shows nodes 300, labeled sequentially from 0 to 18. Links 310 are network links between nodes 300 that connect and provide a means for travel of data packets between nodes. Nodes 300 can be WDM optical routers.

Tables 400 and 401 of FIGS. 4A and 4B outline the results of the integrated analysis method of the present invention for the Pan European topology of FIG. 3. The integrated analysis method of this invention seeks to optimize the number of router components, such as the number of wavelength converters and optical buffers used to solve data packet contention. To do this, one of the things the method of this invention determines is how many delay lines are required per shared output buffer in a router.

Table 400 of FIG. 4A shows the results, assuming n (number of wavelengths per fiber) equals 32, of the average utilization at the input links of the routers at nodes 300 of FIG. 3, the number of inlets/outlets, the maximum number of wavelength converters in use per time slots, the percentage of wavelength conversion per signal (defined as total number of fixed wavelength converters per n signals), and the total number of delay lines required in the router for a network probability of packet loss of $10 \times 10^{-7}$.

Table 401 of FIG. 4B shows the results, assuming n (number of wavelengths per fiber) equals 32, of the average utilization at the input links of the routers at nodes 300 of FIG. 3, the number of inlets/outlets, the maximum number of wavelength converters in use per time slots, the percentage of wavelength conversion per signal (defined as total number of fixed wavelength converters per n signals), the total number of delay lines required in a per buffer output scheme, and the total number of delay lines required for one shared buffer scheme in the router for a network probability of packet loss of $10 \times 10^{-7}$ and a Hurst parameter equal to 0.9.

From Tables 400 and 401, it can be observed that in the worst case, about 30% of incoming data packets require simultaneous wavelength conversion. Also, it can be seen that some of the routers (routers 3,8,13, and 14) do not require wavelength conversion and output buffering. Further, routers 7, 17 and 18 do not require buffering, but do require wavelength conversion. Table 400 also shows that the number of delay lines per outlet varies for each router. Also, since some of the routers do not require output buffers, those routers can be replaced by optical cross-connects. Table 401 of FIG. 4B shows that the number of delay lines using one shared buffer is lower than that for a per output buffer scheme. This reduction in the number of delay lines for one shared buffer is due to the gain resulting from multiplexing multiple links in one buffering module.

FIGS. 5 and 6 show Tables 500 and 600, respectively, that summarize the results of the number of delay lines per outlet ($B_x$) for nodes 4 and 9, respectively, of FIG. 3. Tables 500 and 600 also show the number of the node to which each outlet is connected. Note that the number of delay lines varies per outlet. The reason for this effect is that traffic load per outlet is not balanced because the routing protocol has a tendency to send packets with different destinations through preferred paths in the network. Therefore, more delay lines are needed to solve contention of packets, and, in some cases, more output fibers are required. This is also indicated in Tables 500 and 600 where more than one fiber is needed between two routers.

In the above example of the dimensioning algorithm of the integrated analysis method of the present invention, it can be concluded that a router architecture with about $[(0.3)n \times N]$ conversion capacity and having asymmetric buffering capacity is enough to solve all the possible blocking in a router within the network topology of this example analysis. The method of the present invention can be used with different network topologies to determine where and which components can be reduced to determine a preferred router architecture for a given network topology with respect to number of components. Such a preferred router architecture can comprise a router having a reduced number of components (as in the example above) while having the same routing performance as the baseline router used in the analysis method of this invention.

The method of this invention, and the preferred WDM all-optical packet-switched router of the present invention, provide an important advantage in that the number of wavelength converters required to solve all the possible contentions within a router can be reduced from (N×n) to approximately (0.3) (N×n). The number of delay lines per outlet can also be reduced and can be an optimized number for the router architecture. This can result in a reduction in the number of SOAs 24. The preferred router architecture of this invention has a further advantage in that data packets will pass through the minimal number of optical components inside router 10 of one embodiment of this invention. This can reduce the accumulation of noise (as amplified spontaneous emission noise (ASE)) and possible intra-band crosstalk. Further, the architecture of the present invention provides a multicast/broadcast capability at the switch level.

Figure 7A:
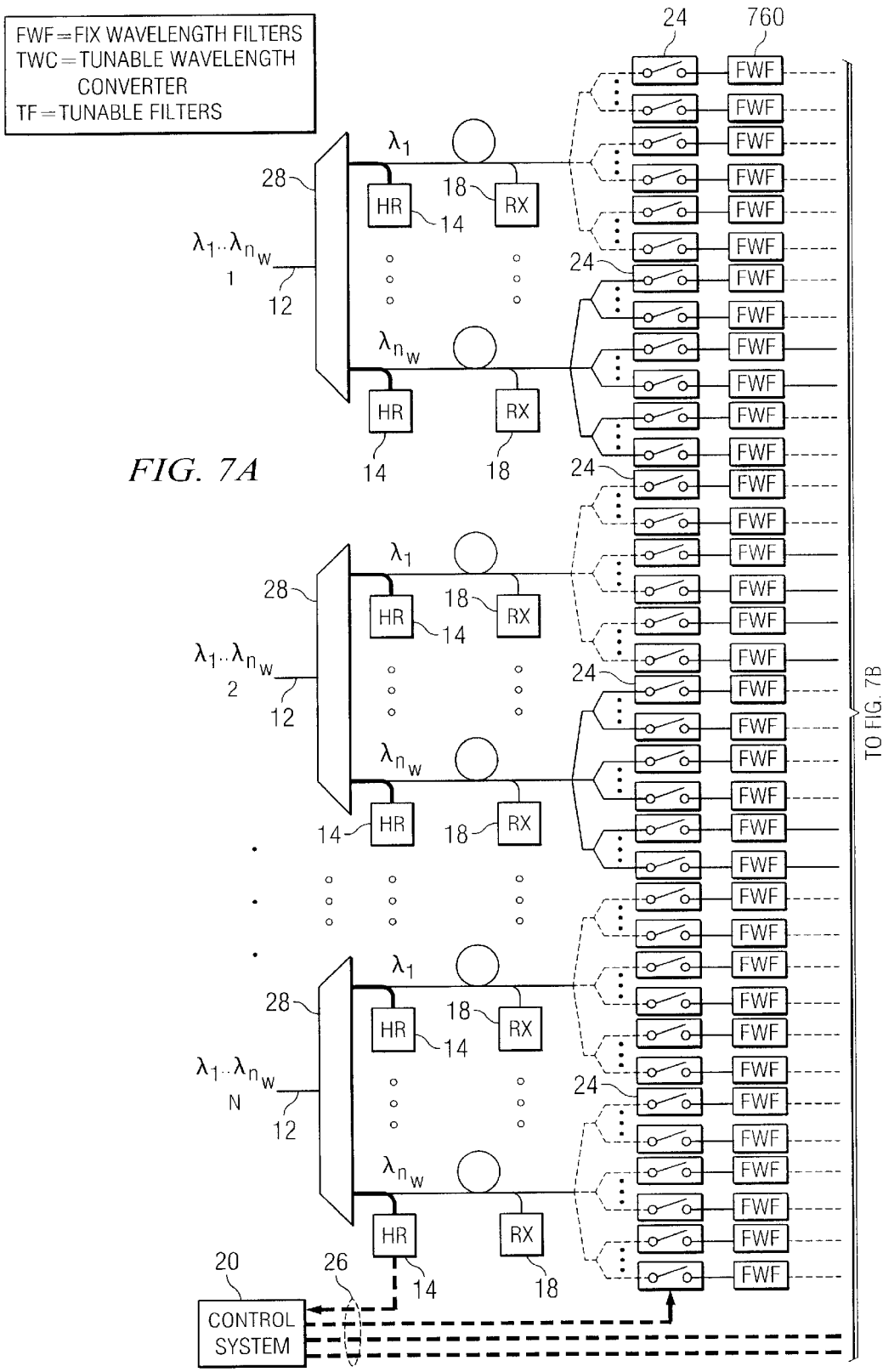
FIG. 7 shows an embodiment of preferred WDM optical packet switched router architecture of this invention.
Figure 7B:
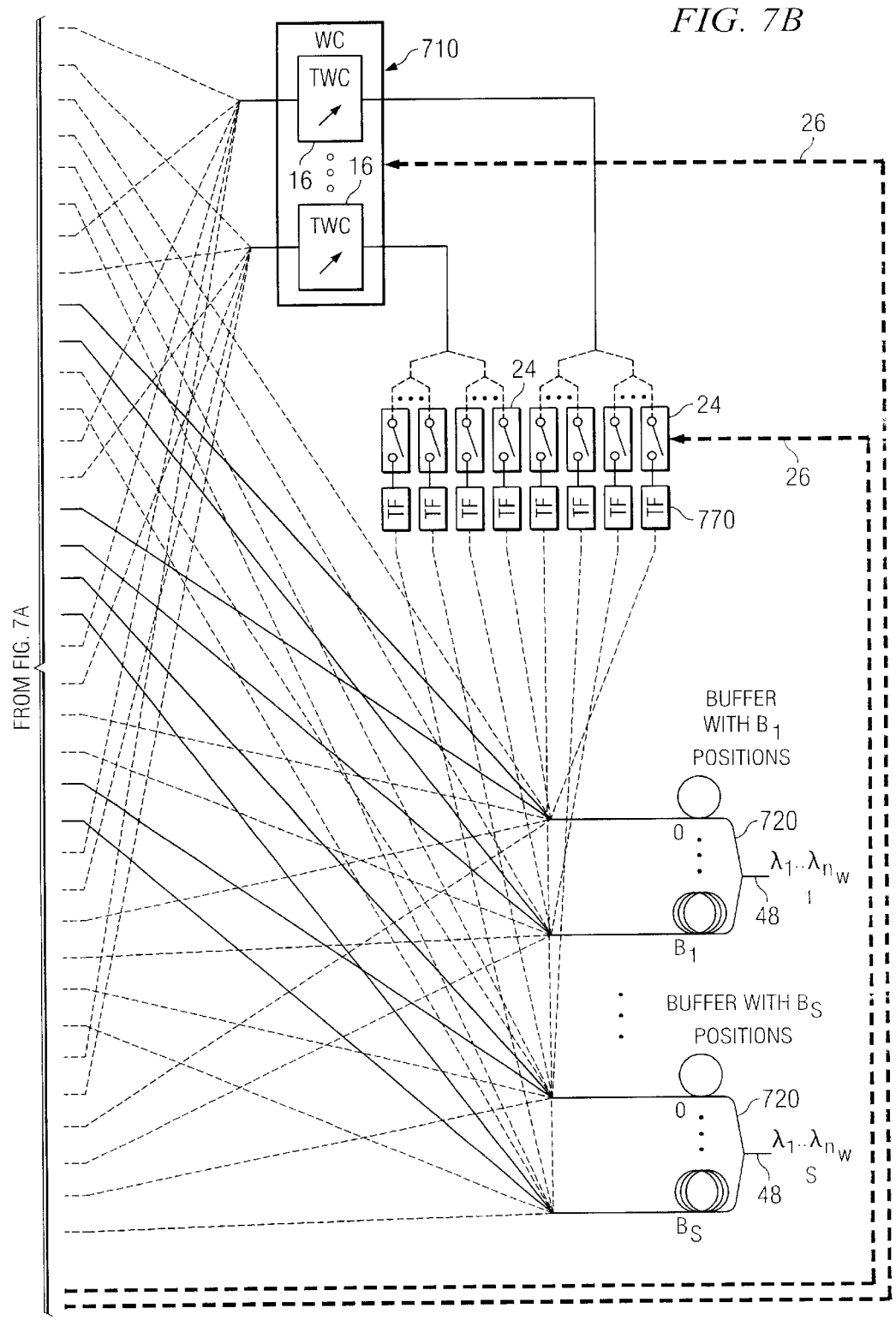
Figure 8A:
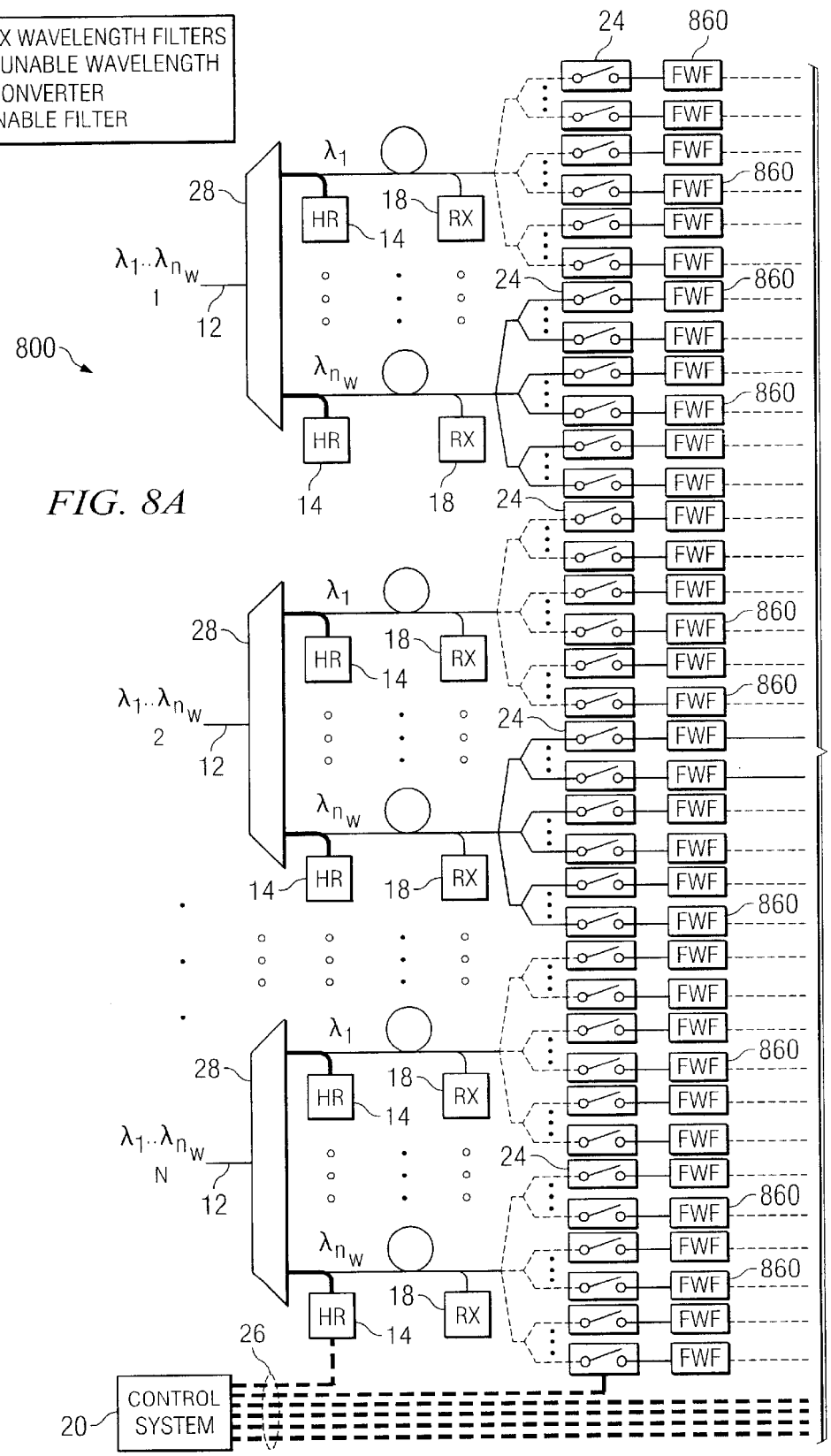
FIG. 8 shows another embodiment of the preferred WDM optical packet switched router architecture of this invention.
Figure 8B:
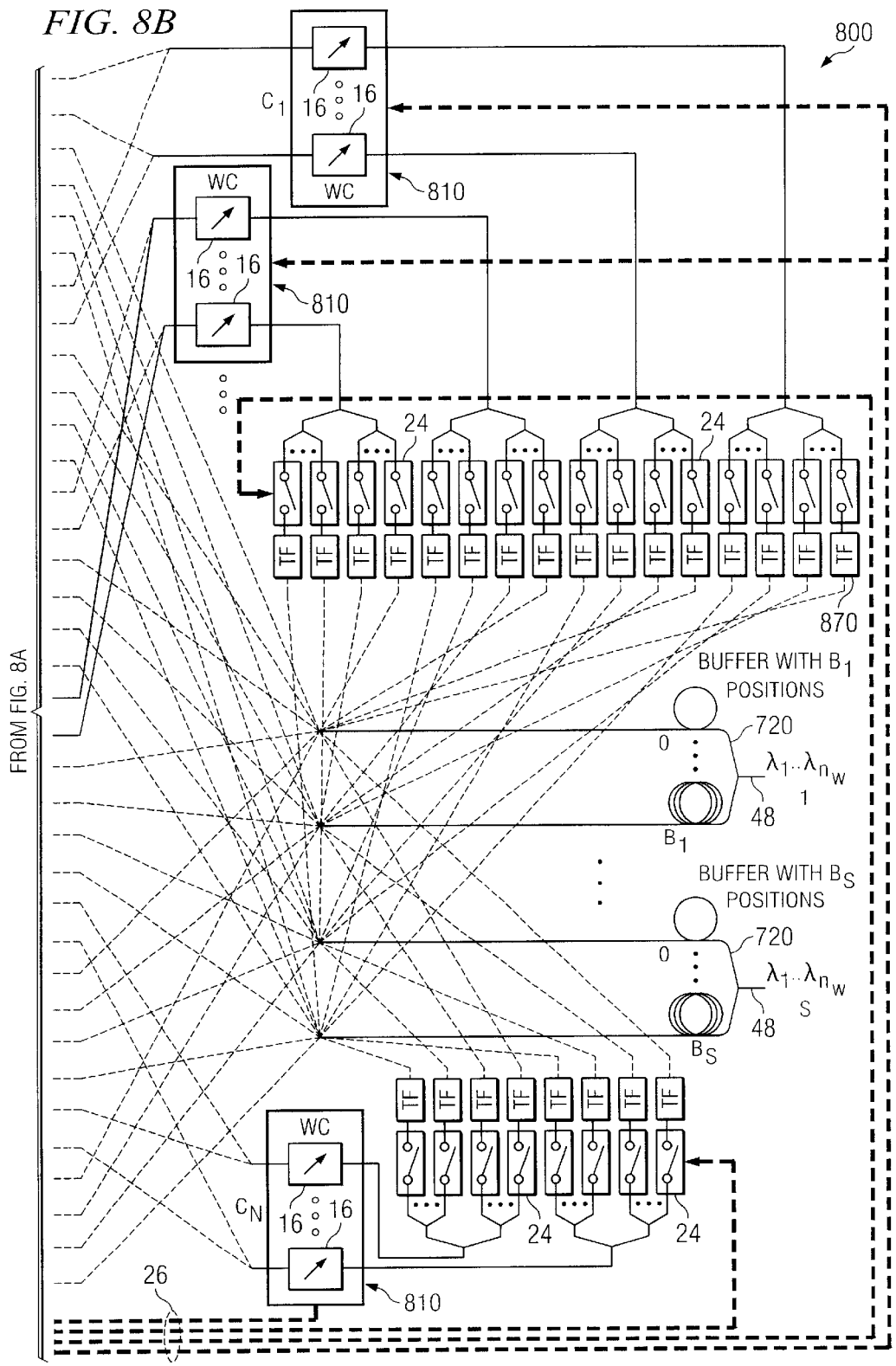
Figure 9A:
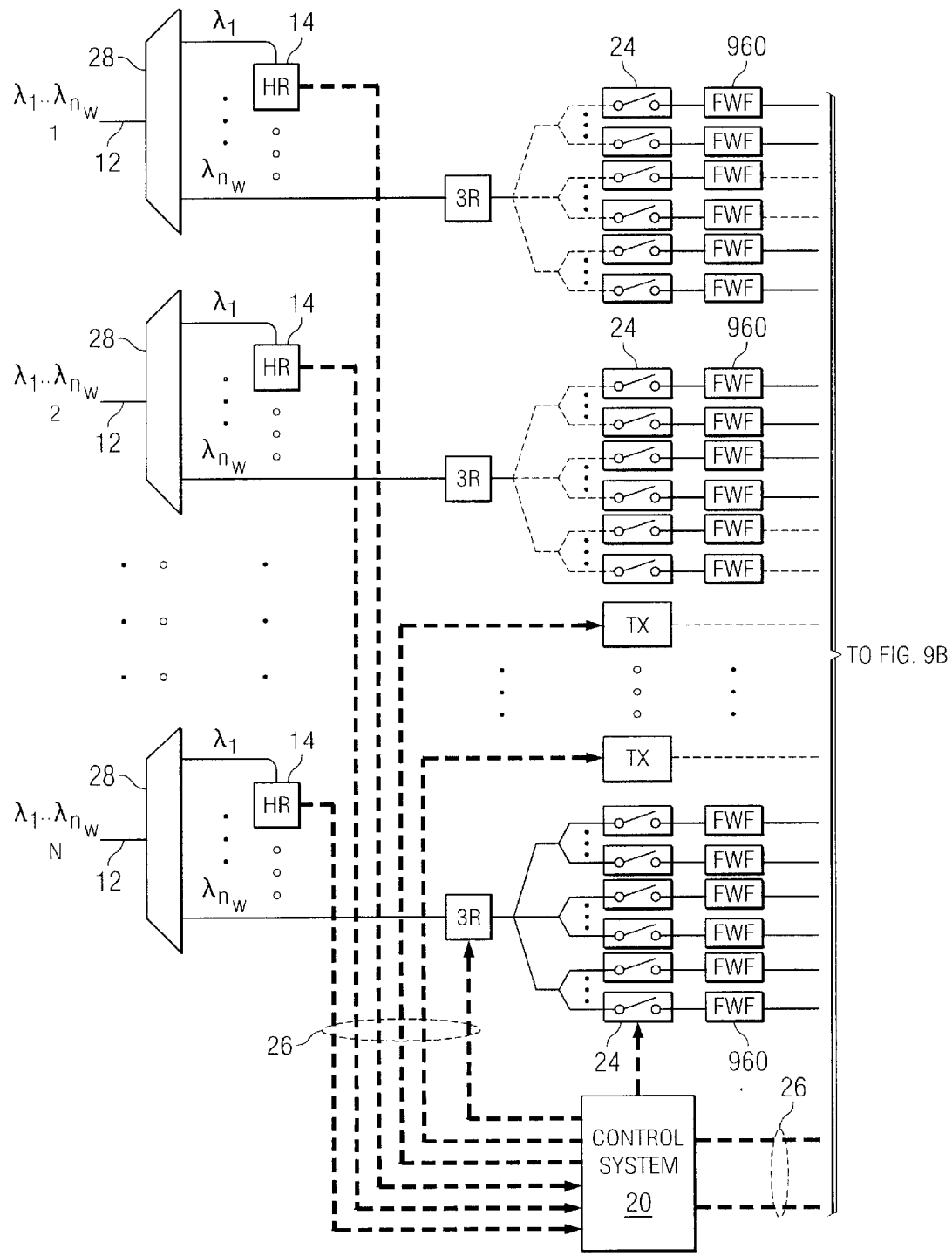
FIG. 9 shows still another embodiment of the preferred WDM optical packet switched router architecture of this invention.
Figure 9B:
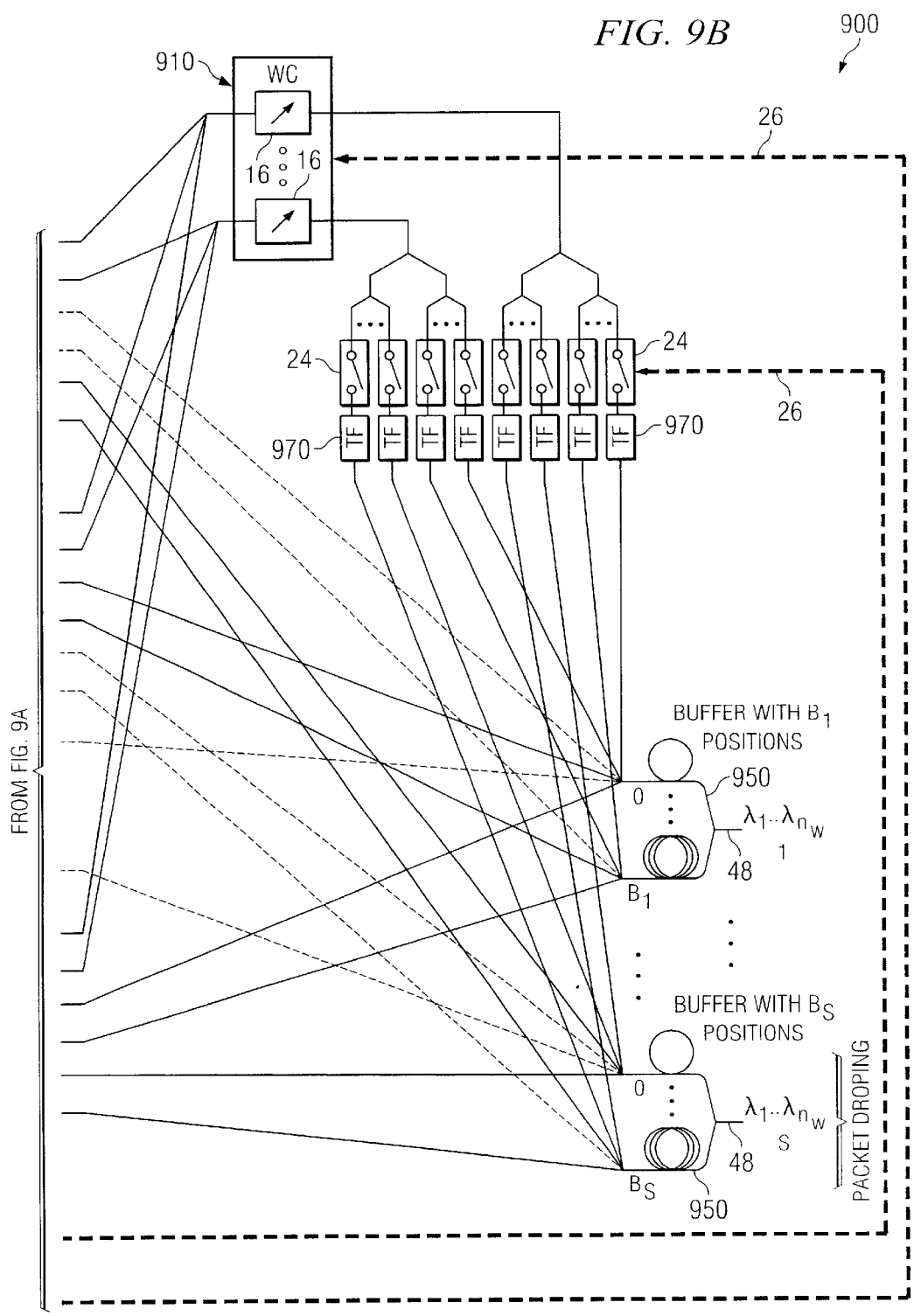

FIGS. 7, 8 and 9 show three other embodiments of the preferred WDM optical packet switched router architecture of the present invention. The router architectures of FIGS. 7, 8 and 9 can be derived according to the teachings of the method for integrated analysis of the present invention.

FIG. 7 shows an asymmetrical all-optical router architecture 700 where data packets are selected for wavelength conversion using optical gates (SOAs 24). As described above, C, the number of tunable wavelength converters 16, may be about 30% of the total number of wavelengths, n, times N, the total number of input WDM fibers 12. The number of tunable wavelength converters 16 can be determined according to the packet network dimensioning algorithm of the present invention as discussed above. The number of wavelength converters 16 depends on the network topology, the location of the router, the number of wavelengths used and the routing scheme used. The components of router architecture 700 of FIG. 7 are labeled in accordance with the router architecture of FIGS. 1A, 1B and 1C and corresponding components have the same functionality.

FIG. 7 further comprises wavelength conversion module 710, comprised of wavelength converters 16. The architecture of FIG. 7 also has an asymmetric number of delay lines at output buffers 720. The number of delay lines $B_x$ (where x the outlet number, and x=1 . . . S) per output buffer is determined according to the dimensioning algorithm of this invention. The number of delay lines $B_x$ can have a range from 0 up to about 50, depending on cost and router performance desired. The number of delay lines $B_x$ also depends on the network topology, the location of the router, the number of wavelengths used, and the routing scheme used. Router 700 of FIG. 7 also includes fixed wavelength filters 760 and tunable wavelength filters 770, for passing selected wavelength data packets in a manner well known in the art.

FIG. 8 shows an embodiment of the WDM router of the present invention having an asymmetric architecture with asymmetric optical buffering and sets of wavelength conversion modules 810 providing tunable wavelength conversion. Tunable wavelength conversion modules 810 of router 800 perform the same function as tunable wavelength conversion module 710 of FIG. 7, except that they comprise discrete subsets of tunable wavelength converters 16, as opposed to a single block. Router 800 also comprises fixed wavelength filters 860 and tunable wavelength filters 870, for passing selected wavelength data packets in a manner well known in the art.

The embodiment of this invention shown in FIG. 8 illustrates that in the event that a large number of wavelength converters is required, the wavelength conversion module 710 of FIG. 7 can be divided into several small modules 810. This can be accomplished by creating sets of one inlet and one wavelength conversion module with $C_f$ wavelength converters per module, as shown in FIG. 8, or sets of two inlets and one wavelength conversion module, and so on. This can reduce the number of clamp gain SOAs 24 for switching. However, the total number of wavelength converters increases.

The embodiments of this invention shown in FIGS. 7 and 8 comprise one receiver 18 per wavelength. Receivers 18 can be eliminated if the information of the packet header is transmitted out of band and hence in a different wavelength, as shown in FIG. 9. For example, using $\lambda_1$ for header transmission and the other wavelengths for payload transmission, as in the case of burst switching.

FIG. 9 shows another embodiment of the WDM router architecture of the present invention having an asymmetric architecture, out-of-band header transmission, a dedicated outlet for packet dropping, and 3R regeneration. 3R regeneration is the regeneration of the signal with retiming and reshaping. Here the bit clock is extracted from the signal, and the signal is reclocked and reshaped. This process completely resets the effects of nonlinearities, fiber dispersion, and amplifier noise. As discussed above, FIGS. 7 and 8 show one receiver per wavelength. This can be modified, as shown in FIG. 9, by dedicating a certain number of outlets for packet dropping. The number of outlets for packet dropping can be determined from the particular application.

As is the case of FIG. 7, the components in FIGS. 8 and 9 are labeled in a manner similar to the corresponding components in FIGS. 1A, 1B and 1C, and corresponding components have the same functionality. Router 900 of FIG. 9 further comprises shared output buffers 950, and wavelength conversion module 910, comprising tunable wavelength converters 16. Router 900 also comprises fixed wavelength filters 960 and tunable wavelength filters 970, for passing selected wavelength data packets in a manner well known in the art.

Figure 10A:
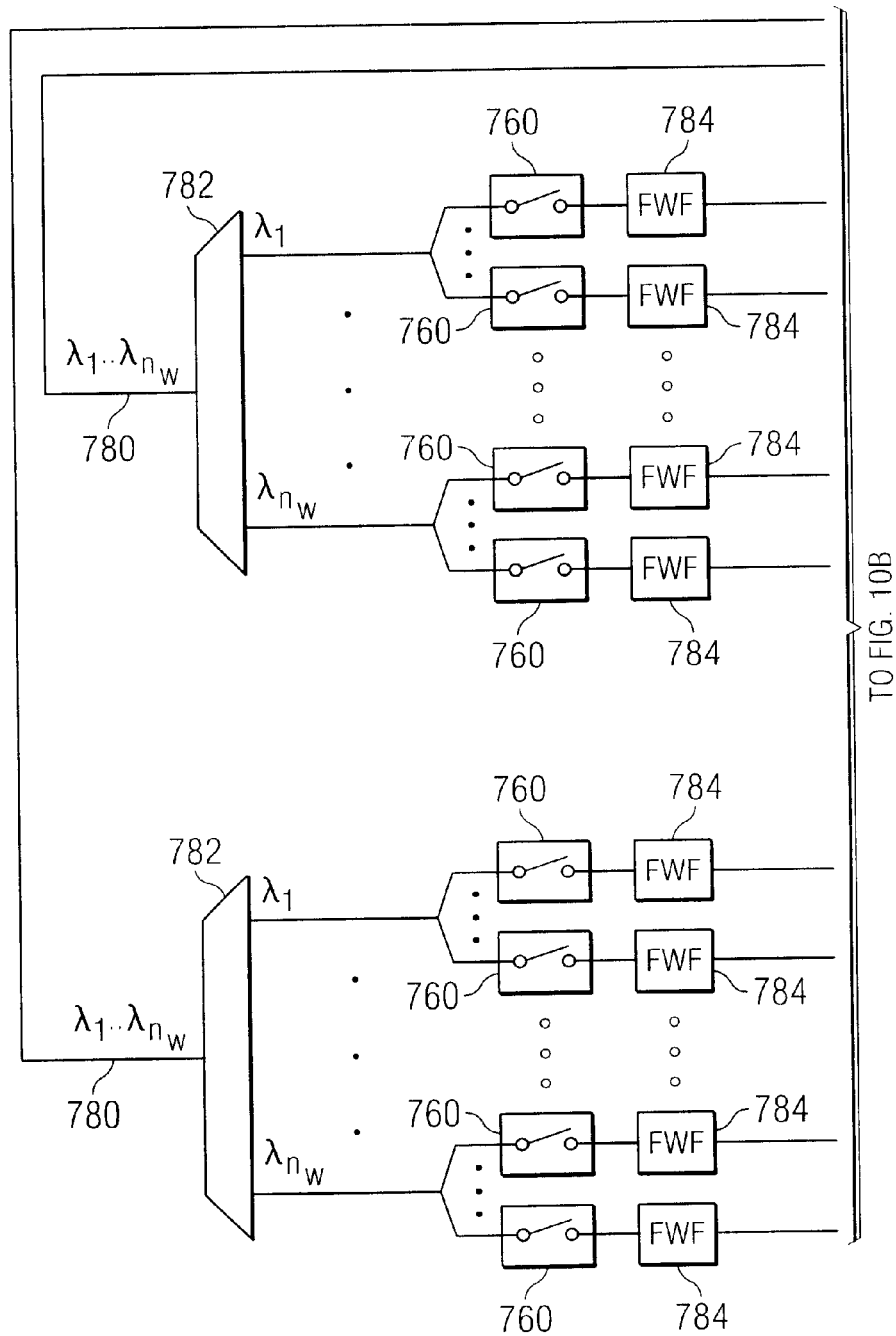
FIG. 10 shows an embodiment of the preferred WDM all-optical packet-switched router architecture with shared buffers of this invention.
Figure 10C:
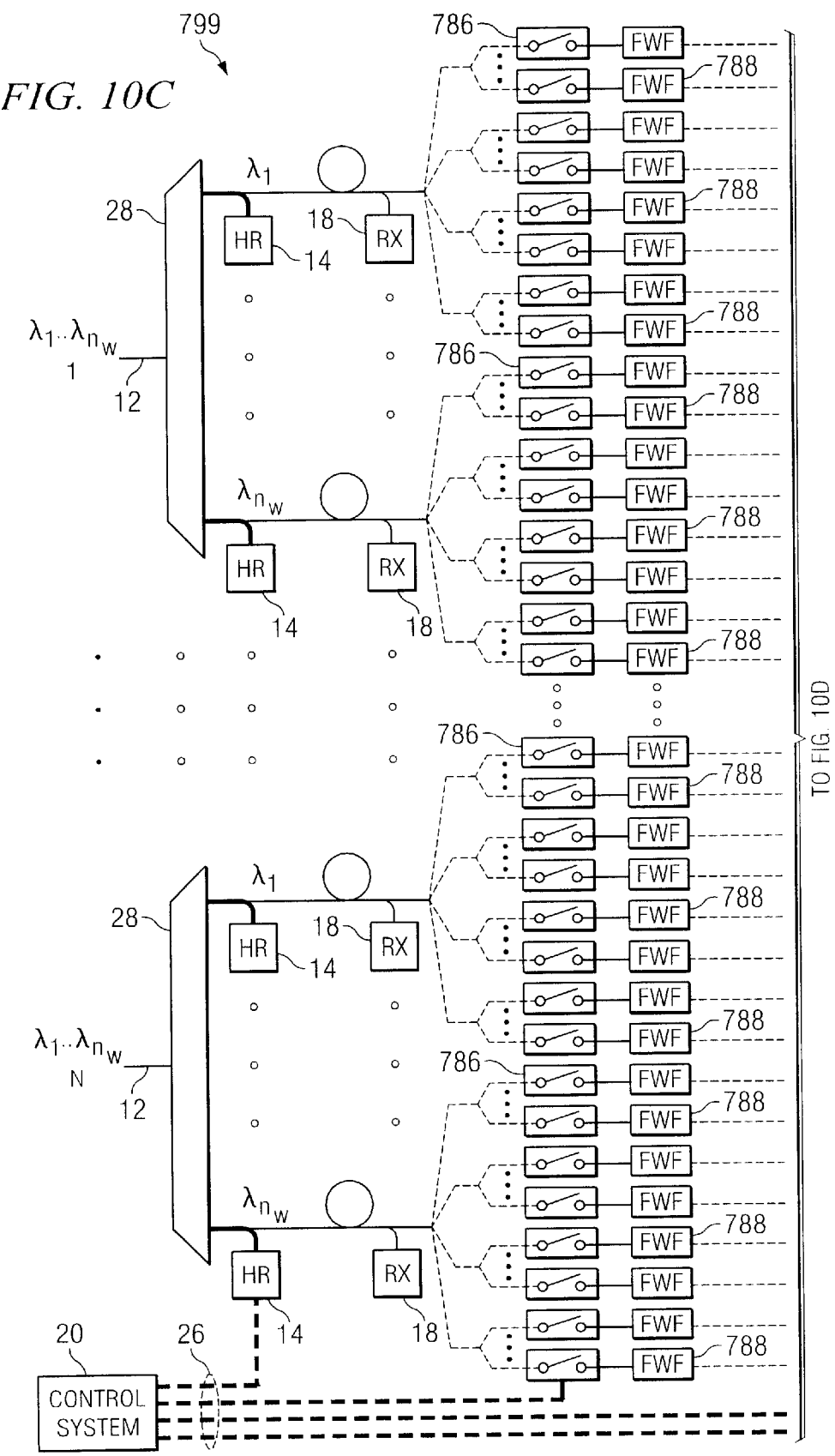
Figure 11A:
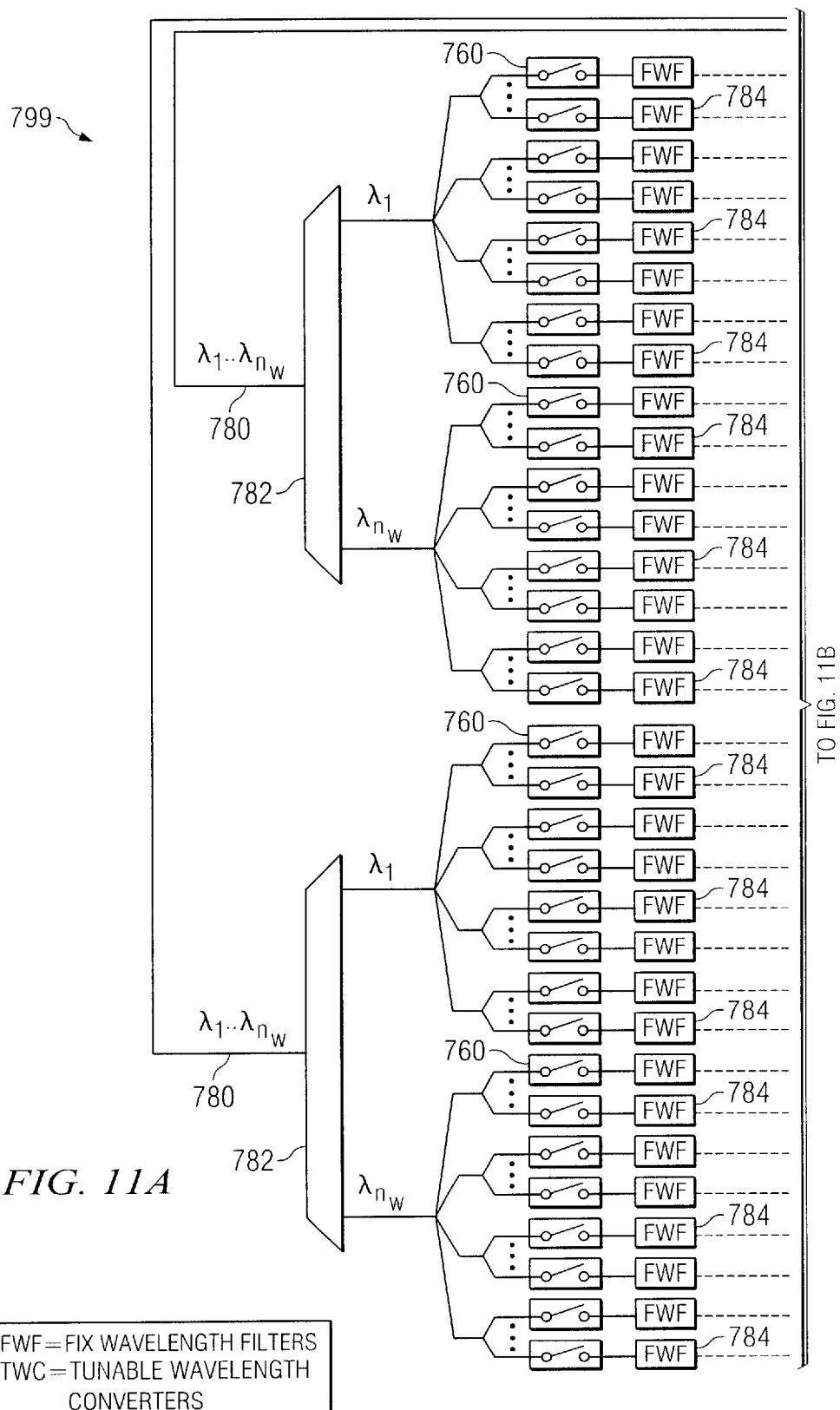
FIG. 11 shows another embodiment of the preferred WDM optical packet-switched router architecture with shared buffers of this invention.
Figure 11C:
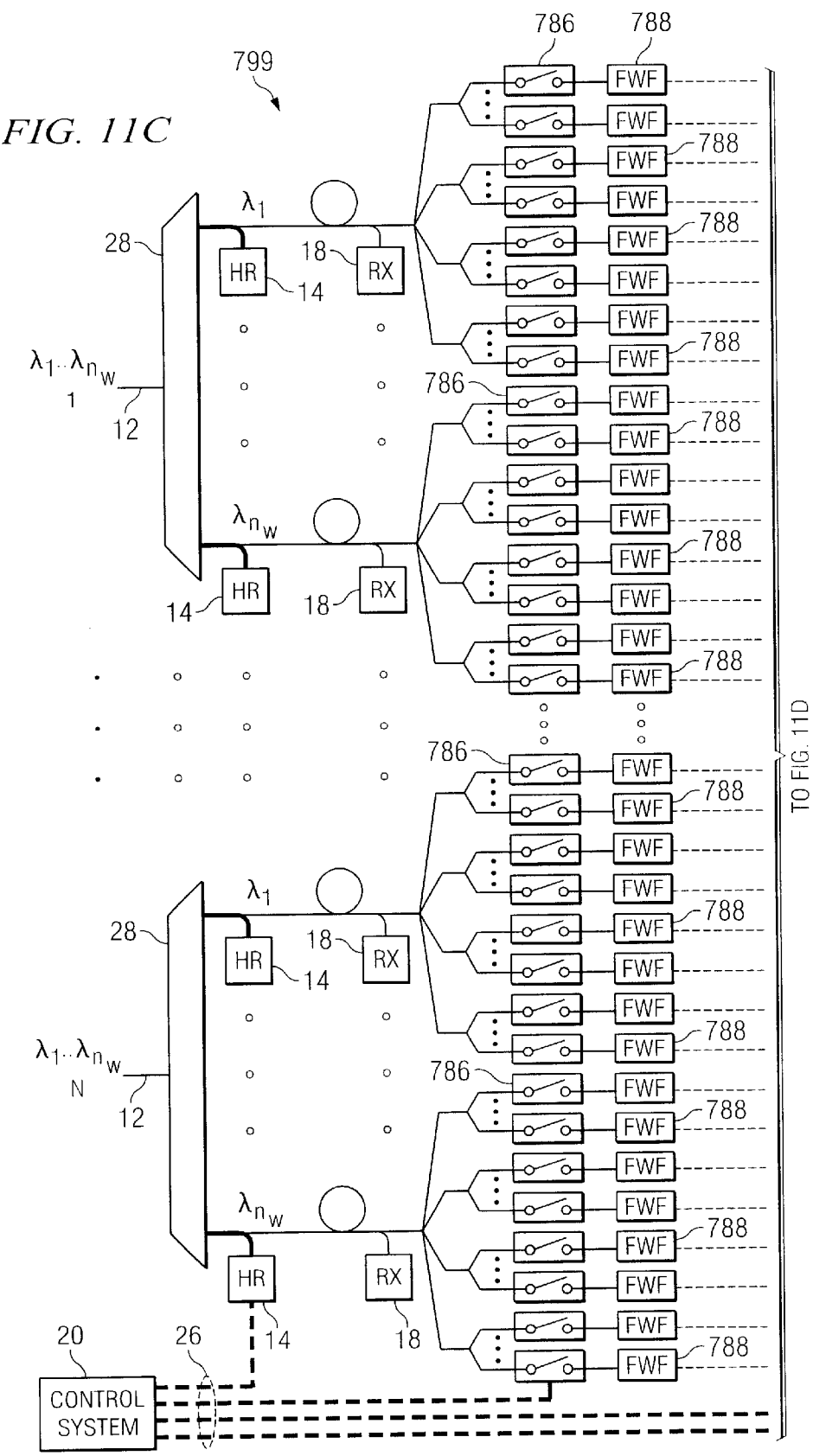
Figure 12A:
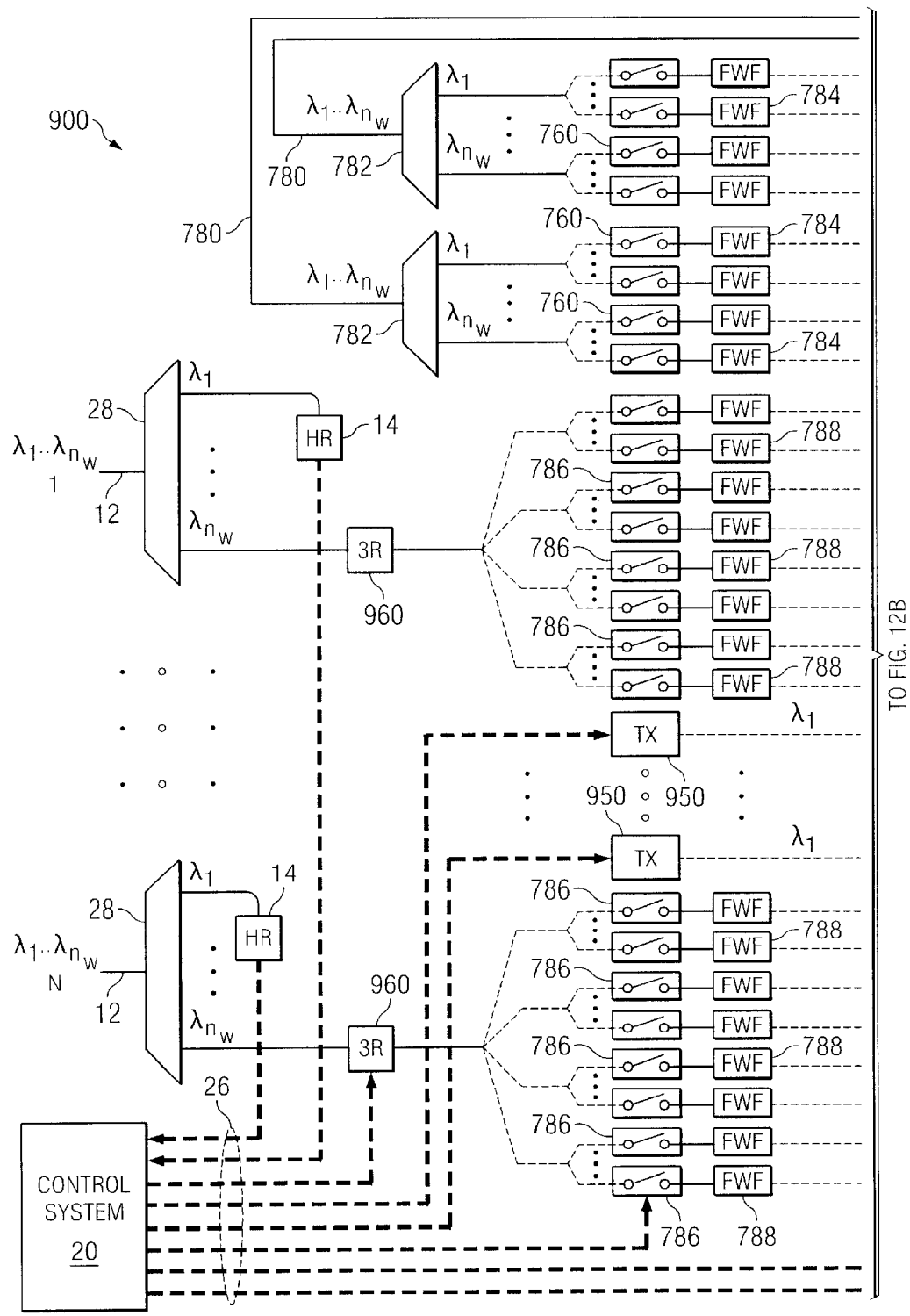
FIG. 12 shows still another embodiment of the preferred WDM optical packet-switched router architecture with shared buffers of this invention.
Figure 12B:
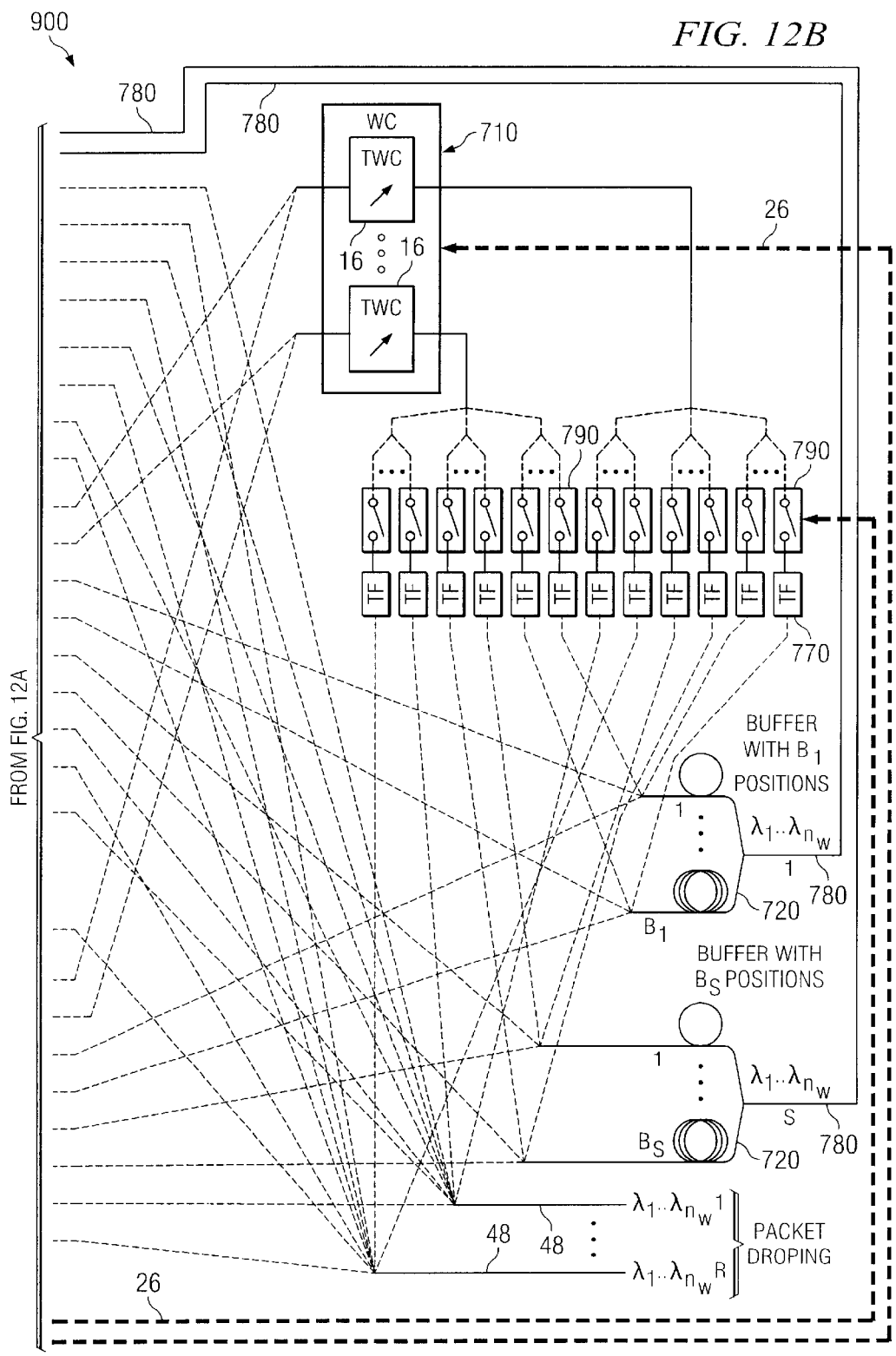

FIGS. 10, 11 and 12 show three more embodiments of a preferred WDM all-optical packet-switched router architecture with shared buffers of the present invention. The router architectures of FIGS. 10, 11 and 12 can likewise be derived according to the teachings of the method for integrated analysis of the present invention.

FIG. 10 shows an embodiment of the router architecture of this invention comprising an asymmetrical WDM all-optical router architecture 700 with shared output optical buffering and tunable wavelength converters, where data packets are selected for wavelength conversion using optical gates (SOAs 24). As described above, C, the number of tunable wavelength converters 16, may be about 30% of the total number of wavelengths, n, times N, the total number of input WDM fibers 12. The number of tunable wavelength converters 16 can be determined according to the packet network dimensioning algorithm of the present invention as discussed above. The number of wavelength converters 16 depends on the network topology, the location of the router, the number of wavelengths used and the routing scheme used. The components of router architecture 700 of FIG. 10 are labeled in accordance with the labeling of the other FIGUREs described herein and corresponding components have the same functionality.

FIG. 10 further comprises wavelength conversion module 710, comprised of wavelength converters 16. The embodiment of this invention shown in FIG. 10 includes shared output buffers 720, that in principle can be a single large output buffer. One reason to divide a large buffer into several smaller buffers is to reduce noise, such as ASE noise, to reduce timing jitter, and to reduce intraband crosstalk. However, if the level of noise is low, it is preferable to have a single large shared output buffer to reduce component count.

The number of delay lines $B_x$ (where x is the outlet number, and x=1 . . . S) per shared output buffer 720 is determined according to the dimensioning algorithm of this invention. The number of delay lines $B_x$ can have a range from 0 up to about 50, depending on cost and router performance desired. The number of delay lines $B_x$ also depends on the network topology, the location of the router, the number of wavelengths used, and the routing scheme used. Router 700 of FIG. 10 also comprises fixed wavelength filters 760 and tunable wavelength filters 770, for passing selected wavelength data packets, in a manner well known in the art.

Like in FIG. 1C, the embodiment of this invention shown in FIG. 10 can provide for data packets to be routed through router matrix 799 along various paths. For example, data packets can be routed through router matrix 799 without wavelength conversion and without buffering by traveling a path through SOA's 786, fixed wavelength filters 788 and on to an output WDM fiber 48; or, data packets can be routed through SOA's 786, fixed wavelength filters 788, get wavelength converted within wavelength conversion module 710 to avoid a conflict, and then go through SOA's 790 and tunable filters 770 to be directed to an output WDM fiber 48; or, data packets can be routed through router matrix 799 with both buffering and wavelength conversion along a path through SOA's 786, then fixed wavelength filters 788, through wavelength conversion module 710, then through SOA's 790 and tunable filters 770 to get directed to a shared buffer 720 to avoid conflict, then along a recirculation line 780 to get recirculated through a secondary demultiplexer 782, through SOA's 760 and fixed wavelength filter 784, and then exit along a WDM output fiber 48; or, lastly, data packets can get routed through router matrix 799 without wavelength conversion, but with buffering and recirculation as described above, and then exit along a WDM fiber 48.

FIG. 11 shows an embodiment of the asymmetric WDM all-optical router architecture with shared buffering of the present invention having an asymmetric architecture with re-circular (multiple) buffering. FIG. 11 is almost identical in its operation to FIG. 10, with the exception that the embodiment of this invention shown in FIG. 11 can comprise two additional paths through router matrix 799. Data packets that have been recirculated along a recirculation line 780, a secondary demultiplexer 782, through SOA's 760 and fixed wavelength filter 784, can then be routed in the embodiment of FIG. 11 back through wavelength conversion module 710, or directly back through a shared buffer 720, and from that point through the paths previously described. The embodiment of the router architecture of this invention shown in FIG. 11 can thus provide for multiple buffering and wavelength conversion of a data packet by recirculating the data packet multiple times.

The performance of a router can thus be upgraded using the re-circular buffering of the embodiment of the router architecture of this invention shown in FIG. 11. The outputs of shared buffers 720 are reconnected to wavelength conversion module 710 and to the inputs of shared buffers 720. Although this architecture can solve more data packet contentions, the number of router components is increased. The embodiments of this invention shown in FIGS. 10 and 11 have one receiver 18 per wavelength. Receivers 18 can be eliminated if the information of the packet header is transmitted out of band, and hence in a different wavelength, as shown in FIG. 12. For example, by using $\lambda_1$ for header transmission and the other wavelengths for payload transmission, as in the case of burst switching.

FIG. 12 shows another embodiment of the WDM router architecture with shared buffering of the present invention, having an asymmetric architecture, out-of-band header transmission, a dedicated outlet for packet dropping, and 3R regeneration. As discussed above, 3R regeneration is the regeneration of the signal with retiming and reshaping. The bit clock is extracted from the signal, and the signal is reclocked and reshaped. This process completely resets the effects of nonlinearities, fiber dispersion, and amplifier noise. As discussed above, FIGS. 10 and 12 show one receiver per wavelength. This can be modified by dedicating a certain number of outlets for packet dropping, as shown in FIG. 12.

As is the case of FIG. 10, the components in FIGS. 11 and 12 are labeled in accordance with the labeling of the other FIGUREs described herein, and corresponding components have the same functionality. The operation and description of FIG. 12 is substantially the same as that for FIG. 10, with the exception that receivers 18 are eliminated, and out-of-band header transmitters 950 and 3R regeneration modules 960 are included to provide the functions described above.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. An optical router, comprising:

at least one input fiber for receiving one or more optical data packets;

a plurality of input demultiplexers for demultiplexing said data packets;

an optical-to-electric converter associated with the output of each input demultiplexer for converting header information from each of said data packets into electric form;

a control unit for processing said header information and generating control signals to control data packet routing through said optical router;

a space switch block for routing each data packet based on a current output status;

a wavelength conversion module for assigning a different internal wavelength to data packets selected for conversion based on said current output status;

a secondary space switch block for routing said wavelength converted data packets based on said current output status;

a buffer, for applying a preset level of delay to data packets selected for delay based on said current output status by said space switch block and said secondary space switch block;

a secondary demultiplexer associated with the output of said buffer for demultiplexing data packets selected for delay;

a delay space switch block for routing said delayed data packets based on said current output status; and at least one output fiber for outputting said data packets from said optical router.

2. The router of claim 1, wherein said buffer is a shared buffer.

3. The router of claim 1, wherein said demultiplexers demultiplex said data packets based on wavelength.

4. The router of claim 1, wherein said wavelength conversion module further comprises one or more wavelength converters to assign a different internal wavelength to each of said data packets selected for conversion based on said current output status.

5. The router of claim 4, wherein said wavelength converters are tunable wavelength converters.

6. The router of claim 1, wherein said space switch block, said secondary space switch block and said delay space switch block further comprise a plurality of SOA's for selecting and forwarding said data packets based on said current output status.

7. The router of claim 1, wherein said current output status is an intended output fiber for each of said data packets.

8. The router of claim 1, wherein said control unit further comprises software instructions to provide the functionality of said control unit.

9. The router of claim 1, wherein said buffer is an optical fiber delay line buffer.

10. The router of claim 1, wherein said buffer comprises one or more fiber delay line (FDL) buffers.

11. The router of claim 10, wherein one of said one or more FDL buffers provides zero delay.

12. The router of claim 10, wherein each of said one or more FDL buffers provides a delay of one or more unit increments.

13. The router of claim 12, wherein said one or more unit increments are equal to the average size of said plurality of data packets.

14. The router of claim 1, wherein said router provides broadcast and multicast capability, voice-over-IP and video-on-demand.

15. An optical IP switching method, comprising the steps of:

receiving one or more data packets at one or more input fibers of an optical router, wherein each data packet has a payload and header information;

demultiplexing said data packets at a plurality of input demultiplexers;

at an optical-to-electric converter associated with the output of each input demultiplexer, extracting and converting header information from each of said data packets into electric form;

at a control unit, processing said header information and generating control signals to control data packet routing through said optical router;

routing each data packet based on a current output status at a first space switch block;

assigning a different internal wavelength to data packets selected for conversion based on said current output status, at a wavelength conversion module;

routing said wavelength converted data packets based on said current output status at a secondary space switch block;

applying a preset level of delay at a buffer to data packets selected for delay based on said current output status;

demultiplexing data packets selected for delay at a secondary demultiplexer associated with the output of said buffer;

routing said delayed data packets based on said current output status at a delay space switch block; and outputting said data packets from said optical router along at least one output fiber.

16. The method of claim 15, wherein said buffer is a shared buffer.

17. The method of claim 15, wherein said wavelength converter is a tunable wavelength converter.

18. The method of claim 15, wherein said internal wavelength is the same wavelength as the original wavelength.

19. The method of claim 15, wherein each data packet is assigned a different internal wavelength.

20. The method of claim 15, wherein said current output status is an intended output fiber each of said data packets.

21. The method of claim 15, wherein said buffer is a fiber delay line (FDL) buffer.

22. The method of claim 15, wherein said buffer comprises one or more fiber delay line (FDL) buffers.

23. The method of claim 22, wherein one of said one or more FDL buffers provides zero delay.

24. The method of claim 22, wherein each of said one or more FDL buffers provides a delay of one or more unit increments.

25. The method of claim 24, wherein said one or more unit increments are equal to the average size of said plurality of data packets.

26. The method of claim 15, wherein said data packets can be broadcast to each of said at least one output fibers for providing broadcast and multicast capability, voice-over-IP and video-on-demand.

27. The method of claim 15, wherein said control unit further comprises software instructions to provide the functionality of said control unit.

28. The method of claim 15, wherein said router is a wave division multiplexing ("WDM") switching router and wherein said one or more input fibers and said at least one output fiber are WDM fibers.

29. The method of claim 15, wherein one or more of said data packets are received at said router along a common one of said one or more input fibers and transmitted from said router along a plurality of different output fibers.

30. An integrated analysis method for determining a preferred network router architecture comprising the steps of:

simulating, with a network simulator, the operation of a desired network topology having at least one baseline router;

establishing a steady state in said network simulation;

applying a router and network dimensioning algorithm to said network topology for a predetermined number of clock cycles; and determining said preferred network router architecture for said at least one baseline router based on results of said router and network dimensioning algorithm, wherein said preferred network router architecture comprises a router having a minimum number of components while having the same routing performance as said baseline router and wherein said minimum number of components comprises a number of tunable wavelength converters equal to $0.3(n \times N)$, where N is the number of input fibers into said preferred network router architecture and n is the number of wavelengths that can be carried on each of said input fibers.

31. The method of claim 30, wherein said baseline router is a WDM all-optical packet-switched router and said preferred network router architecture is a WDM all-optical packet-switched router architecture with shared buffers.

32. The method of claim 30, wherein said baseline router is a WDM all optical packet switched router and said preferred network router architecture is a WDM all-optical packet switched router architecture without shared buffers.

33. The method of claim 30, wherein said network simulator is a Monte Carlo simulation.

34. The method of claim 33, wherein said Monte Carlo simulation is a C language computer program.

35. The method of claim 33, wherein single path routing with least number of hops is used by said Monte Carlo simulation to decide an output router for an arriving data packet.

36. The method of claim 30, wherein said simulating step further comprises tracking the path and location of each of one or more data packets input into said simulated network from source to destination.

37. The method of claim 30, wherein said baseline router is an asymmetric WDM router with shared optical buffering.

38. The method of claim 30, wherein said baseline router is a asymmetric WDM router with tunable wavelength conversion and optical buffering.

39. The method of claim 30, wherein said simulating step comprises simulating the operation of a Pan European network topology.

40. The method of claim 30, wherein said desired network topology has a plurality of nodes, wherein each node is a router, and links between each node and at least one other node, for travel of data packets between nodes.

41. The method of claim 30, wherein establishing said steady state further comprises running said network simulator for a simulation cycle, said simulation cycle comprising a preset number of clock cycles.

42. The method of claim 41, wherein said preset number of clock cycles is 200,000.

43. The method of claim 41, wherein said simulation cycle is sufficient for the transient period of the simulation to die out and for said network dimensioning algorithm to determine said preferred network router architecture.

44. The method of claim 43, wherein the sufficiency of said simulation cycle is determined by establishing the condition where injection throughput equals absorption throughput plus loss throughput.

45. The method of claim 30, wherein said steady state is maintained for a preset number of clock cycles.

46. The method of claim 45, wherein said preset number of clock cycles is 100,000.

47. The method of claim 30, wherein said steady state is determined by comparing the desired network topology's injection through-put to the sum of its absorption through-put and lost through-put.

48. The method of claim 30, wherein said preferred network router architecture is a optical WDM network router architecture having asymmetric buffering capacity and 0.3(n×N) tunable wavelength converters, where N is the number of input fibers into said preferred network router architecture and n is the number of wavelengths that can be carried on each of said input fibers.

49. The method of claim 48, wherein said asymmetric buffering capacity is a shared buffer asymmetric buffering capacity.

50. The method of claim 30, wherein said router and network dimensioning algorithm comprises the steps of:

(a) injecting input data packets into said desired network topology;
(b) extracting header information from said data packets;
(c) selecting an input data packet for routing;
(d) searching for a corresponding outlet for said selected input data packet in a forwarding table of said baseline router;
(e) forwarding any input data packets stored in a buffer associated with said baseline router to their corresponding outlet;
(f) determining if there is an available empty slot at the output of said baseline router,
(g) if there is an available empty slot, forwarding said selected incoming data packet to said empty slot; and
(h) repeating steps (c) through (g) for each input data packet injected into said desired network topology.

51. The method of claim 50, wherein said buffer is a shared buffer.

52. The method of claim 30, wherein said simulating step further comprises simulating the traffic pattern of said desired network topology with an on/off sources traffic model.

53. The method of claim 52, wherein said traffic model uses a Pareto heavy tail distribution to model the length of each on/off period.

54. The method of claim 52, wherein a uniform distribution is used to assign an output destination to incoming data packets.

55. The method of claim 52, wherein a single input link is used to simulate data packet injection into all the routers in said desired network topology.

56. An integrated analysis method for determining a preferred network router architecture comprising the steps of:

simulating, with a network simulator, the operation of a desired network topology having at least one baseline router;

establishing a steady state in said network simulation;

applying a router and network dimensioning algorithm to said network topology for a predetermined number of clock cycles;

determining said preferred network router architecture for said at least one baseline router based on results of said router and network dimensioning algorithm, wherein said preferred router architecture comprises:

at least one input fiber for receiving one or more optical data packets;

a plurality of input demultiplexers for demultiplexing said data packets based on wavelength;

an optical-electric converter associated with the output of each input demultiplexer for converting header information from each of said data packets into electric form;

a control unit for processing said header information and generating control signals to control data packet routing through said router architecture;

a space switch block for routing each data packet based on a current output status;

a wavelength conversion module for assigning a different internal wavelength to data packets selected for conversion based on said current output status;

a secondary space switch block for routing said wavelength converted data packets based on said current output status;

a buffer, for applying a preset level of delay to data packets selected for delay based on said current output status by said space switch block and said secondary space switch block;

a secondary demultiplexer associated with the output of said buffer for demultiplexing data packets selected for delay;

a delay space switch block for routing said delayed data packets based on said current output status; and at least one output fiber for outputting said data packets from said router architecture.

57. The method of claim 56, wherein said buffer in said preferred router architecture is a shared buffer.

58. The method of claim 56, wherein said preferred router architecture is a WDM switched router architecture, and wherein said one or more input fibers and said at least one output fiber are WDM fibers.

59. The method of claim 56, wherein one or more of said data packets are received at said router architecture along a common one of said one or more input fibers and transmitted from said router along a plurality of different output fibers.

* * * * *